(12) United States Patent
Jain et al.

(10) Patent No.: US 10,467,660 B2
(45) Date of Patent: *Nov. 5, 2019

(54) CENTRALIZED PUBLISHER MANAGEMENT

(71) Applicant: YP LLC, Tucker, GA (US)

(72) Inventors: Mehul Jain, Foster City, CA (US); Matthew Nakano, La Crescenta, CA (US); Maninder Singh Dhillon, Redondo Beach, CA (US); Vishwanath Kumar, Burbank, CA (US); Brian G. Kuhn, Palm Springs, CA (US); Deepak Kumar Thakral, Burbank, CA (US)

(73) Assignee: YP LLC, D/FW Airport, TX (US)

( * ) Notice: Subject to any disclaimer, the term of this patent is extended or adjusted under 35 U.S.C. 154(b) by 257 days.

This patent is subject to a terminal disclaimer.

(21) Appl. No.: 15/599,521

(22) Filed: May 19, 2017

(65) Prior Publication Data

US 2017/0262901 A1 Sep. 14, 2017

Related U.S. Application Data

(60) Continuation of application No. 14/457,847, filed on Aug. 12, 2014, now Pat. No. 9,697,543, which is a
(Continued)

(51) Int. Cl.
*G06F 15/16* (2006.01)
*G06Q 30/02* (2012.01)
(Continued)

(52) U.S. Cl.
CPC ........ *G06Q 30/0276* (2013.01); *G06Q 10/10* (2013.01); *G06Q 30/0273* (2013.01); *H04L 41/0213* (2013.01)

(58) Field of Classification Search
CPC .......... G06Q 30/0276; G06Q 30/0273; G06Q 10/10; H04L 41/0213
See application file for complete search history.

(56) References Cited

U.S. PATENT DOCUMENTS 5,930,474 A 7/1999 Dunworth et al.
6,753,887 B2 6/2004 Carolan et al.
(Continued)

OTHER PUBLICATIONS

Berry, "Data Mining Techniques: for Marketing, Sales and Customer Relationships," 2004.
(Continued)

*Primary Examiner* — John B Walsh
(74) *Attorney, Agent, or Firm* — Mark E. Stallion; Greensfelder, Hemker & Gale, P.C.

(57) ABSTRACT

A management system can recommend and manage publishing content with publishers of business information. A representative can provide unique identifying information for a business that can be used to determine a category of similar businesses. Based on the identified category, a list of publishers can be identified to the representative as related to the business category. The representative can select one or more of the publishers to publish content about the business. Based on the representative selection, the system can request a set of content from the representative. After receiving the content from the representative, the system can translate the content to formats acceptable to each of the publishers. The content can then be provided to the publishers to publish. The published content can then be monitored for problems, and corrected if problems are discovered.

21 Claims, 21 Drawing Sheets

Related U.S. Application Data division of application No. 14/244,781, filed on Apr. 3, 2014, now Pat. No. 8,812,647.

(51) Int. Cl.
*H04L 12/24* (2006.01)
*G06Q 10/10* (2012.01)

(56) References Cited

U.S. PATENT DOCUMENTS

| | | |
|---|---|---|
| 7,668,832 B2 | 2/2010 | Yeh |
| 7,689,466 B1 | 3/2010 | Benbrahim et al. |
| 7,774,348 B2 | 8/2010 | Delli Santi et al. |
| 7,801,897 B2 | 9/2010 | Egnor |
| 8,239,273 B1 | 8/2012 | Marshall et al. |
| 8,370,197 B2 | 2/2013 | Axe et al. |
| 8,577,016 B1 | 11/2013 | Duva et al. |
| 8,781,105 B1 | 7/2014 | Duva et al. |
| 8,812,647 B1 | 8/2014 | Jain et al. |
| 9,256,761 B1 | 2/2016 | Sahu et al. |
| 9,407,767 B2 | 8/2016 | Jain et al. |
| 9,451,393 B1 | 9/2016 | Cullen et al. |
| 9,697,543 B2 | 7/2017 | Jain et al. |
| 2002/0049635 A1 | 4/2002 | Mai et al. |
| 2002/0123984 A1 | 9/2002 | Prakash |
| 2004/0073693 A1 | 4/2004 | Slater et al. |
| 2005/0055337 A1 | 3/2005 | Bebo et al. |
| 2006/0149774 A1 | 7/2006 | Egnor |
| 2006/0242017 A1 | 10/2006 | Libes et al. |
| 2006/0277108 A1 | 12/2006 | Altberg et al. |
| 2007/0100834 A1 | 5/2007 | Landry et al. |
| 2007/0161382 A1 | 7/2007 | Melinger et al. |
| 2007/0162334 A1 | 7/2007 | Altberg et al. |
| 2007/0233577 A1 | 10/2007 | Glass |
| 2007/0288437 A1 | 12/2007 | Xia |
| 2008/0059298 A1 | 3/2008 | Waag et al. |
| 2008/0270164 A1 | 10/2008 | Kidder et al. |
| 2009/0144068 A1 | 6/2009 | Altberg et al. |
| 2009/0187459 A1 | 7/2009 | Hayes, Jr. et al. |
| 2009/0247193 A1 | 10/2009 | Kalavade |
| 2009/0299831 A1 | 12/2009 | Li et al. |
| 2010/0093441 A1 | 4/2010 | Rajaraman et al. |
| 2010/0250361 A1 | 9/2010 | Torigoe et al. |
| 2011/0125573 A1 | 5/2011 | Yonezaki et al. |
| 2011/0196733 A1 | 8/2011 | Li et al. |
| 2011/0213741 A1 | 9/2011 | Shama et al. |
| 2011/0275047 A1 | 11/2011 | Gomes et al. |
| 2011/0295628 A1 | 12/2011 | Priyadarshan et al. |
| 2012/0078742 A1 | 3/2012 | Oleen |
| 2012/0078938 A1 | 3/2012 | Davis et al. |
| 2012/0116872 A1 | 5/2012 | Hicken et al. |
| 2012/0179568 A1 | 7/2012 | Soroca et al. |
| 2013/0080577 A1 | 3/2013 | Taylor et al. |
| 2013/0124259 A1 | 5/2013 | Chourey et al. |
| 2013/0129060 A1 | 5/2013 | Gopalakrishnan et al. |
| 2013/0254035 A1 | 9/2013 | Ramer et al. |
| 2013/0297442 A1 | 11/2013 | Simons et al. |
| 2014/0012678 A1 | 1/2014 | Hayes, Jr. |
| 2014/0122257 A1 | 5/2014 | Avner et al. |
| 2014/0222551 A1 | 8/2014 | Jain et al. |
| 2015/0046214 A1 | 2/2015 | Jain et al. |

OTHER PUBLICATIONS

Office Action dated Apr. 7, 2015 in U.S. Appl. No. 12/965,773, 13 pages.
Office Action dated Aug. 13, 2013 in U.S. Appl. No. 12/965,741, 13 pages.
Office Action dated Aug. 14, 2013 in U.S. Appl. No. 12/965,773, 14 pages.
Office Action dated Aug. 21, 2015 in U.S. Appl. No. 12/952,975, 11 pages.
Office Action dated Feb. 28, 2013 in U.S. Appl. No. 12/965,741, 12 pages.
Office Action dated Jan. 25, 2013 in U.S. Appl. No. 12/965,773, 11 pages.
Office Action dated Jul. 28, 2015 in U.S. Appl. No. 13/965,123, 29 pages.
Office Action dated Mar. 12, 2015 in U.S. Appl. No. 12/965,741, 15 pages.
Office Action dated May 13, 2015 in U.S. Appl. No. 12/940,976, 14 pages.
USPTO Notice of Allowance for U.S. Appl. No. 14/244,781, dated Jun. 26, 2014, 33 pages, USA.
United States Patent and Trademark Office, Office Action for U.S. Appl. No. 14/457,847, dated Nov. 2, 2016, 13 pages, U.S.A.
United States Patent and Trademark Office, Notice of Allowance for U.S. Appl. No. 14/457,847, dated Mar. 1, 2017, 5 pages, U.S.A.

| Web Browser | | | □ 回 ⊠ |
|---|---|---|---|
| FILE  EDIT  VIEW  FAVORITES  TOOLS  HELP | | | |
| Address | assessment.example.com | | ▽ ⇒GO |

Scan Results for Pizza Place     Welcome User! | Sign Out

Scanning Complete
██████████████████████▢
Total Errors Found: 70

Suggested Category:
Casual Pizza Restaurants 1116

| Incorrect Business Information | Category Sites Missing Your Information |
|---|---|
| 59 | 11 |
| Breakdown of Problems | Popular Category Sites Without Your Information |
| Business Name  9 | Yellow Pages  ⊘ |
| Phone Number  11 | Google  ⊘ |
| Street Address  6 | Facebook  ⊘ |
| Zip Code  3 | Bing  ⊘ |
| City  6 | Yelp  ⊘ |
| Hour Open  9 | Yahoo!  ⊘ |
| Business Website  15 | Bay Area Family  ⊘ |

1112    [ Fix Errors ]

Selected Category:
Casual Pizza Restaurants }1118
Your Profile is 90% Complete
████████████████████▢
Need 5 Items to Complete Your Listings Address:    1114    Logo:
Pizza Place
123 Lombard St.,
San Francisco, CA 94115
925-555-2367

Description:
Pizza Place is known for quality ingredients and our unique specialty pizzas...

Hours Open:   Information Missing } 1120
Website:   Information Missing
Menu:   Information Missing
Payment:   Information Missing

[ Edit Profile Information ]

| Listing | Listing Details | Description | Errors Found | Progress |
|---|---|---|---|---|
| Urban Spoon  1110 | Pizza Place 321 Lombard St., San Francisco, CA 94115 925-555-2368 | Pizza Place is known for quality ingredients and our unique specialty pizzas... | Phone Number Street Address Hours Open Website | Fix Requested 9/15/2013 |
| Play in the Bay  1108 | Pizza Place 321 Lombard St., San Francisco, CA 94115 925-555-2368 | Pizza Place is known for quality ingredients and our unique specialty pizzas... | Phone Number Street Address Hours Open Website | [ Fix ] [ Mark as Correct ] |
| Facebook  1106 | | Listing Not Found | | [ Fix ] |
| SF News  1104 | Pizza Place 123 Lombard St., San Francisco, CA 94115 925-555-2367 | Pizza Place is known for quality ingredients and our unique specialty pizzas... | Listing is Correct | [ View Listing ] |

CENTRALIZED PUBLISHER MANAGEMENT

CROSS-REFERENCE TO RELATED APPLICATIONS

This application is a continuation of U.S. application Ser. No. 14/457,847 filed Aug. 12, 2014, which is a division of U.S. application Ser. No. 14/244,781 filed Apr. 3, 2014, which issued as U.S. Pat. No. 8,812,647 on Aug. 19, 2014, the contents of which are hereby incorporated in their entireties by reference.

BACKGROUND

Aspects of the disclosure relate to online publishing. In particular, aspects of the disclosure relate to systems, methods, apparatuses, and computer-readable media for managing and evaluating publisher content.

Marketing can be viewed as managing customer experience from brand introduction through repeat purchases. This customer experience can include advertising, social media, product placement, package design, interface design and many other engagement points. Each of these engagement points can cost both time and/or money. Business representatives can choose which engagement points are worth the time and effort.

There are many ways to reach out to potential customers using these engagement points. Business representatives can reach out to customers through such ways as advertising, social media, displays and sponsorships. This reaching out to customers can have a purpose of interacting with the customer to bring awareness, cause customer brand reconsideration or adjust brand perception. Through this interaction, a business representative can attempt to recruit and retain customers.

SUMMARY

Techniques described and suggested herein include systems and methods for determining publishers to receive business content. As described herein, certain embodiments use identification information (e.g., address, name, phone number, etc.) as at least a partial basis for such determinations. The representative can select one or more of the publishers to publish content about the business. Based on the representative selection, the system can request a set of content from the representative. After receiving the content from the representative, the system can translate the content to formats acceptable to each of the publishers. The content can then be provided to the publishers to publish. The published content can then be monitored for problems, and corrected if problems are discovered.

Systems can analyze reviews and recommend responses. The system can monitor publishers for content provided by users. When new content about a business is published, the system can notify a representative. The representative can visit a dashboard, which provides recommendations of responses to the published content. The recommendations can help a business navigate responses to negative content and engage with positive content.

Content and content metadata can be analyzed to determine whether a set of reviews can be attributed to a single persona. The system can analyze publisher content provided by a first user account to determine if the content is similar to other content provided by a second user account. The similarities can include both lexical information and meta data (e.g., IP address, user name). If sufficient similarities exist, the system can determine that the first and second user accounts share a same source (e.g., a same user).

Systems can analyze publisher information to determine one or more ratings for an online business evaluation. Publisher content can be evaluated to determine statistics about the business. Based on the statistics, the business can be rated in one or more characteristics.

Systems can analyze publisher information to determine attributes of the business and sentiment relating to the identified attributes. The system can perform a lexical analysis of content provided by a publisher to determine attributes described in the content. The analysis can include sentiment analysis to determine whether the attribute is positively viewed or negatively viewed. A representative can view this attribute information and determine aspects of the business in need of correction. The attributes can also be compared with other businesses that share a category.

In one aspect, a system for centrally managing online interactions amongst a plurality of publishers is disclosed, and may include any one or combination of the following. A network interface may communicate with a client and a first set of publishers over a network providing connectivity to the system, the client and the first set of publishers. A setup interface may receive first content that includes information for unique identification of a business. Storage may hold an association between a first category in a directory and the first set of publishers, the first category representing a classification of a set of businesses sharing common attributes. A matching engine may match the business to the first category from storage based at least in part on the first content received through the setup interface. A management interface may compile second content based at least in part on the first set of publishers associated with the first category, the second content including content for publication by the first set of publishers associated with the first category. A content repository may store the second content compiled by the management interface. A publication interface may communicate with the first set of publishers over the network. A publication engine, using the publication interface, may retrieve at least a portion of the second content from the content repository, transmit the second content to at least a subset of publishers from the first set of publishers and request publication of listings of the business by each of the subset of publishers.

In some embodiments, a translation system may translate the second content stored by the content repository into a third content to meet submission requirements of a publisher. In some embodiments, a recommendation engine may combine the first set of publishers associated with the first category and a second set of publishers selected based at least in part on online influence to form a set of recommended publishers. In some embodiments, the recommendation engine may include a ranking subsystem to rank the set of recommended publishers based at least in part on an importance rating. In some embodiments, the publication engine may include a customer selection interface to receive customer input to select a subset of recommended publishers from the set of recommended publishers at which the second content should be published. In some embodiments, a billing system may determine a payment amount based at least in part on a number of recommended publishers selected by the customer. In some embodiments, a questionnaire engine may prepare a content questionnaire to present through the management interface based at least in part on the category or the subset of publishers. In some embodiments, the first category may be a telephone directory category. In some embodiments, a preview renderer may retrieve at least some of the second content from the content repository and prepare a rendering of how the portion of the second content would appear if published by a publisher.

In another aspect, a method for centrally managing business information amongst a plurality of publishers is disclosed. The method may include any one or combination of the following. Information enabling unique identification of a first business may be received. The first business may be matched to a first category from a set of categories of a directory, where the first business matches one or more categories of the set of categories, the first category representing a first classification of a first set of businesses sharing a first set of common attributes. A first set of publishers may be selected to receive a first set of content describing the first business based at least in part on the first category, the first set of publishers selected for electronic publication of at least some of the first set of content. The first set of content related to the first set of publishers associated with the first category may be retrieved, the first set of content describing first aspects of businesses assigned to the first category, and the first set of content including a first superset of content consumed by each of the first set of publishers. For each of a first subset of publishers from the first set of publishers, a first subset of content may be prepared from the first set of content for consumption by a first publisher from the first subset of publishers; the first subset of content may be transmitted over a communication network to the first publisher; and the first publisher may be caused to publish the first subset of content. Information enabling unique identification of a second business may be received. The second business may be matched to a second category from the set of categories of the directory, where the second business matches to one or more categories of the set of categories, the second category representing a second classification of a second set of businesses sharing a second set of common attributes. A second set of publishers may be selected to receive a second set of content describing the second business based at least in part on the second category, the second set of publishers selected for electronic publication of at least some of the second set of content. The second set of content related to the second set of publishers associated with the second category may be retrieved, the second set of content describing second aspects of businesses assigned to the second category, and the second set of content including a second superset of content consumed by each of the second set of publishers. For each of a second subset of publishers from the second set of publishers, a second subset of content may be prepared from the second set of content for consumption by a second publisher from the second subset of publishers; the second subset of content may be transmitted over the communication network to the second publisher; and the second publisher may be caused to publish the second subset of content. The first category and the second category may be different, the first business and the second business may be different, and a size of a symmetric difference of the first set of publishers and the second set of publishers may be greater than zero.

In some embodiments, the first set of publishers may be ranked based at least in part on a first metric, and recommending the first subset of publishers may be based at least in part on the ranking. In some embodiments, the first metric may be an estimated conversion rate of a consumer of publisher content into a client with a relationship with the first business. In some embodiments, the preparing the first subset of content for consumption by the first publisher from the first subset of publishers may include retrieving a first portion of the first subset of content and preparing a first rendering of how the first portion of the first subset of content would appear if published by the first publisher. The preparing the second subset of content for consumption by the second publisher from the second subset of publishers may include retrieving a second portion of the second subset of content and preparing a second rendering of how the second portion of the second subset of content would appear if published by the second publisher.

In some embodiments, a first set of credentials may be created for use with the first publisher on behalf of the first business. The first set of credentials may be stored for later use. The first set of credentials may be provided when acting on behalf of the first business to publish first information regarding the first business. A second set of credentials may be created for use with the second publisher on behalf of the second business. The second set of credentials may be stored for later use. The second set of credentials may be provided when acting on behalf of the second business to publish second information regarding the second business.

In some embodiments, a first set of published content about the first business published by the first publisher may be monitored for changes. It may be determined that the first set of published content was modified. A warning that the first set of published content was modified may be provided. A second set of published content about the second business published by the second publisher may be monitored for changes. It may be determined that the second set of published content was modified. A warning that the second set of published content was modified may be provided.

In some embodiments, first published content about the first business published by the first publisher may be monitored for a first review of the first business. It may be determined that the first review was negative. A first warning that the first review was negative may be provided. Second published content about the second business published by the second publisher may be monitored for a second review of the second business. It may be determined that the second review was negative. A second warning that the second review was negative may be provided.

In some embodiments, a first suggested response to the first review of the first business based at least in part on the first category may be provided. The first publisher may be caused to publish the first suggested response to the first review. A second suggested response to the second review of the second business based at least in part on the second category may be provided. The second publisher may be caused to publish the second suggested response to the second review.

In yet another aspect, a non-transitory, one or more machine-readable media having machine-readable instructions thereon for managing an online presence are disclosed. The instructions, when executed by one or more computers or other processing devices, may cause the one or more computers or other processing devices to perform one or more of the following. A set of categories for business listings in a directory determined, the set of categories representing classifications of businesses into categories of businesses sharing a set of common attributes, each business belonging to one or more categories. A first set of common attributes that are shared by a first set of businesses assigned to a first category may be identified, the first set of common attributes describing first aspects of the first set of businesses assigned to the first category, and the first set of common attributes defining a first set of content to request from the first set of businesses assigned to the first category. A first set of publishers to associate with the first category may be identified. The first set of common attributes may be associated with the first category, the first set of common attributes defining a first superset of content suitable to request from a first business assigned to the first category, where at least a first portion of the first superset of content is consumed by the first set of publishers. A second set of common attributes that are shared by a second set of businesses assigned to a second category may be identified, the second set of common attributes describing second aspects of the second set of businesses assigned to the second category, and the second set of common attributes defining a second set of content to request from the second set of businesses assigned to the second category. A second set of publishers to associate with the second category may be identified. The second set of common attributes may be associated with the second category, the second set of common attributes defining a second superset of content suitable to request from a second business assigned to the second category, where at least a second portion of the second superset of content is consumed by the second set of publishers. The first category may be different from the second category, and a size of a symmetric difference of the first set of publishers and the second set of publishers is greater than zero.

In some embodiments, the first set of publishers may be monitored for changes to first provided content provided to the first set of publishers on behalf of the first set of businesses assigned to the first category. A warning to a first client of the first business assigned to the first category may be provided consequent to discovery that first changes to the first provided content relating to the first business. The second set of publishers may be monitored for changes to second provided content provided to the second set of publishers on behalf of the second set of businesses assigned to the second category. A warning to a second client of the second business assigned to the second category may be provided consequent to discovery of a second change to the second provided content relating to the second business.

In some embodiments, a first dashboard describing a first set of published content published by the first set of publishers may be provided. A second dashboard describing a second set of published content by the second set of publishers may be provided. In some embodiments, first customer engagement content to publish on behalf of the first business with a first publisher may be determined based at least in part on the first category and the first publisher. Second customer engagement content to publish on behalf of the second business with a second publisher may be determined based at least in part on the second category and the second publisher.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures:

FIG. 11 illustrates a user interface of an embodiment of the management system for publisher recommendation;

Figure 1:
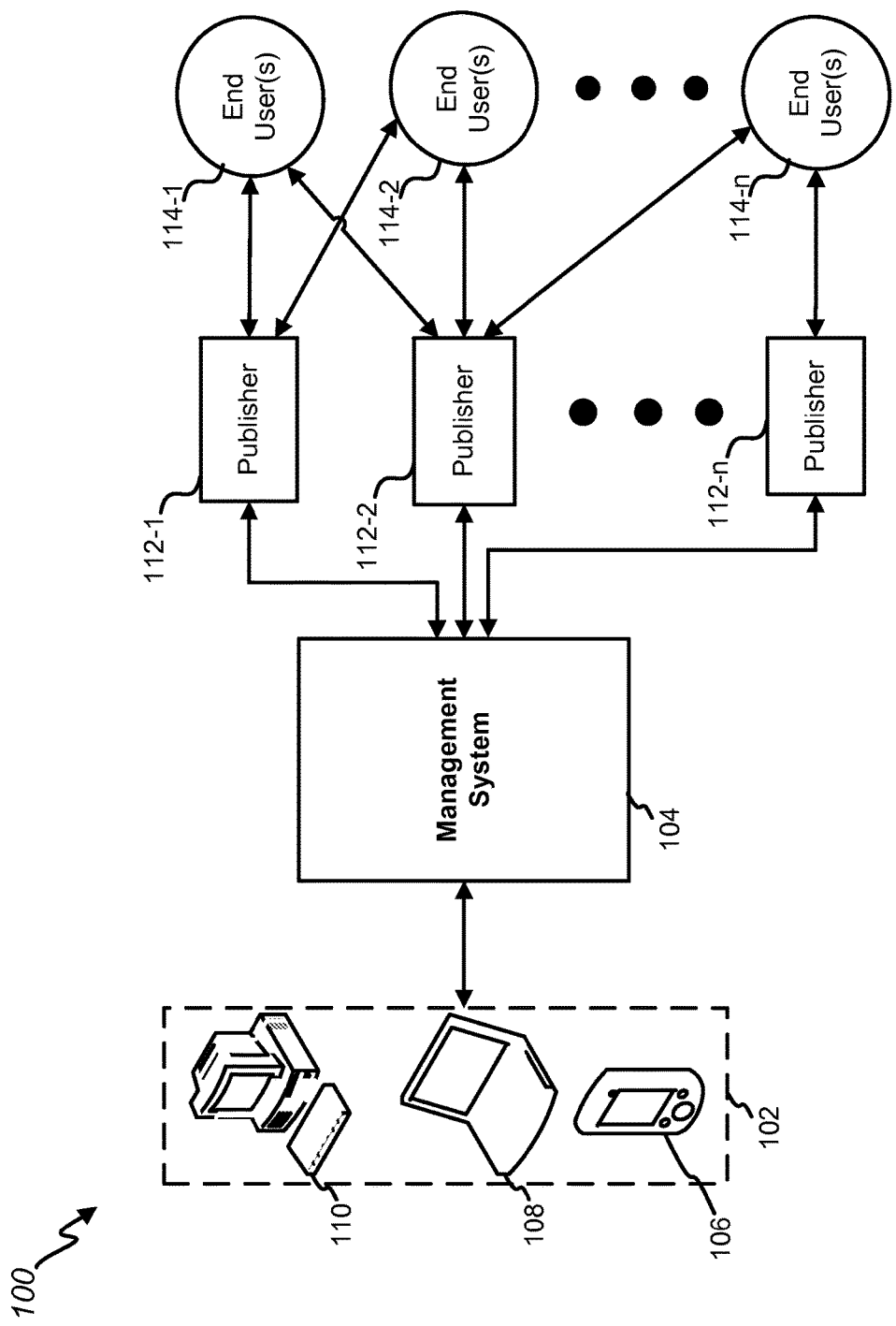
FIG. 1 depicts a block diagram of an embodiment of a listing and reputation management system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Techniques described and suggested herein include systems and methods for determining publishers to receive business content. A list of publishers can be identified to a representative. The representative can select one or more of the publishers to publish content about the business. Based on the representative selection, the system can request a set of content from the representative. After receiving the content from the representative, the system can translate the content to formats acceptable to each of the publishers. The content can then be provided to the publishers to publish. The published content can then be monitored for problems, and corrected if problems are discovered.

The publishing management system can receive a selection of publishers from the representative. Based on the selection, the publishing management system can determine a superset of content to request from the representative about the business (e.g., pictures, hours, products, services, hyperlinks, video, audio, documents, whitepapers, static content, dynamic content, etc.). After receiving the superset of content (or at least a portion thereof), the publishing management system can transmit content from the superset of content to individual publishers, such as through a publisher application programming interface (API). The publishing management system can convert the superset of content to formats usable by the selection of publishers, if needed (e.g., resize pictures, transcode video, translate a word processing document to HTML, etc.).

Systems can analyze reviews and recommend responses. The system can monitor publishers for content provided by users. When new content about a business is published, the system can notify a representative. The representative can visit a dashboard, which provides recommendations of responses to the published content. The recommendations can help a business navigate responses to negative content and engage with positive content.

For example, the publishing management system can identify a negative review of a steakhouse on a restaurant review website. The publishing management system can analyze the negative review, including metadata of the review, to determine a source and/or potential motive of the negative review. Based on the analysis of the review, suggested responses can be proposed. A suggested response can include a public response with an apology, an invitation to talk to the manager and request that people let the business know of any problem with the service at the time of the service. A second suggested response can include a request to a publisher API that the review be taken down as spam because of the lack of details and foreign IP address.

Content and content metadata can be analyzed to determine whether a set of reviews can be attributed to a single persona. The system can analyze publisher content provided by a user account to determine if the content is similar to other content provided by a second user account. The similarities can include both lexical information and metadata (e.g., IP address, user name). If sufficient similarities exist, the system can determine that the user accounts share a same source (e.g., a same user).

For example, the publishing management system can determine that a new positive review was published about a lawn service. The publishing management system can analyze the review, including performing a lexical analysis and obtaining metadata (e.g., IP address, account name, time of posting, etc.), to determine a similarity to another positive review. As the similarities between the reviews exceed a threshold, the publishing management system can determine that the two review accounts are likely the same user operating the accounts (i.e. same persona). A representative of the lawn service can be notified that the review was published and that the persona has published two positive reviews. In some cases, the publishing management system can recommend actions to take based on the review (e.g., sending a private thank you message and/or a coupon).

Systems can analyze publisher information to determine one or more ratings for an online business evaluation. Publisher content can be evaluated to determine statistics about the business. Based on the statistics, the business can be rated in one or more characteristics. The statistics, ratings, and/or characteristics can allow a representative to determine how the business publishing strategy is performing.

For example, publishing management system can analyze published content, including metadata, about and relating to a business. The publishing management system can gather information about aspects of the business including social media interactions, mentions in forums, advertising campaigns, responses to and from the business, etc. The publishing management system can convert the analysis into various statistics (e.g., number of likes per post, number of followers, frequency of posts, median number of responses per post, frequency of business mention in conversations, number of positive reviews, number of publishers with company information, frequency of coupons, etc.).

Systems can analyze publisher information to determine attributes of the business and sentiment relating to the identified attributes. The system can perform a lexical analysis of content provided by a publisher to determine attributes described in the content. The analysis can include sentiment analysis to determine whether the attribute is positively viewed or negatively viewed. A representative can view this attribute information and determine aspects of the business in need of correction.

For example, a review of a computer repair technician can state that the "computer repairman was competent and nice, but their clothing was disgusting." A publishing management system can obtain the review and perform a lexical and sentiment analysis. The analysis can determine that the review indicates positive sentiment for attributes of competency and friendliness, but also a negative sentiment toward an attribute of cleanliness. These attributes can be compiled with other analyses, to form a list of attributes with sentiments. This list can then identify attributes that are mentioned by clients/customers and how they feel about those attributes.

In certain embodiments, determinations of which publishers may receive business content may be based at least in part on an identified category of the business. A representative can provide unique identifying information for a business that can be used to determine a category of similar businesses (e.g., a phone book listing category, NAICS™ (North American Industry Classification System), etc.). In such embodiments, based at least in part on the identified category, a list of publishers can be identified to the representative as related to the business category. For example, an automotive parts store representative can provide uniquely identifying information into a publishing management system (e.g., name, address, etc.). Based on the uniquely identifying information, the publishing management system can determine the automotive parts store can be part of an automotive parts dealer subcategory of an automotive category. Based on the automotive category, the publishing management system can recommend publishers related to the automotive category and generic publishers that are useful across multiple categories. Publishers related to the automotive category can include automotive social media sites (e.g., Autotrader.com), related discussion bulletin boards (e.g., cheapestgas.com) and other web sites that can have an audience identified as related (e.g., familyvacations.com). Generic publishers can also be recommended because of their exposure (e.g., Facebook.com™ LinkedIn.com™, Google+™, etc.). In some embodiments, these recommended publishers are pre-selected based on the determined effectiveness of reaching a target audience (e.g. customers, clients, businesses, etc.) of businesses related to the category.

In some embodiments, systems can analyze reviews and recommend responses based at least in part on an identified category of the business. Based on a category of the business and the analysis of the review, suggested responses can be proposed. For example, a restaurant may be part of a category of fine-dining, a suggested response can include a public response with an apology, an invitation to talk to the manager and request that people let the restaurant know of any problem with the meal at the time of the meal.

With some embodiments, publisher content may be evaluated to determine statistics about the business, ratings of the business in one or more characteristics based on the statistics, and the evaluation can be business category-specific. The online business evaluation can be compared against other businesses in a same or similar business category. This comparison can allow a representative to determine how the business publishing strategy is performing against other businesses, including those from a same category. Using a category of the business to provide areas of emphasis, the statistics can be used to generate rating values for the areas of emphasis. The ratings can be repeated for competitors to provide insight into how competitors are rated, as well as a category average. Using these ratings, a business representative can determine which areas of emphasis could be improved or which provide a competitive advantage.

In some embodiments, systems may not only analyze publisher information to determine attributes of the business and sentiment relating to the identified attributes, but also may compare attributes with other businesses that share a category. The attributes can include attributes as defined by the category and attributes separately identified. This analysis can also be repeated for other businesses. The attributes and sentiments of competitors can be used for comparisons, as well as category averages.

Turning now to FIG. 1, a block diagram of an embodiment of a publisher management system is shown, in accordance with certain embodiments of the present disclosure. A management system 104 provides a single interface for a business representative to manage content provided by publishers 112-1, 112-2 to 112-n to end users 114-1, 114-2 to 114-n on behalf of a business. In some embodiments, the management system 104 can use categories to customize recommendations to the representative in managing content provided to publishers 112-1, 112-2 to 112-n.

The representative operates a computing resource 102, such as a desktop computer 110, laptop computer 108 or mobile device 106, to communicate with the management system 104. The representative makes decisions on behalf of the business. These decisions can include implementing recommendations provided by the management system 104. By using the management system 104, the representative does not need to manage each publisher relationship separately. Further, the representative can be provided more summary information about end user sentiment and/or activity, than could be observed through separate publisher interactions.

The management system 104 can provide a central point to manage information between the business representative, publishers 112-1, 112-2 to 112-n and end users 114-1, 114-2 to 114-n. The management system 104 monitors and analyzes content published by publishers 112-1, 112-2 to 112. Some content published by publishers 112-1, 112-2 to 112 is provided by end users 114-1, 114-2 to 114-n. The management system 104 provides information about content provided by publishers 112-1, 112-2 to 112-n to the computing resource 102. The management system 104 can also receive information from the computing resource 102 and translate the information for use by the publishers 112-1, 112-2 to 112-n. The translated information can then be sent for publication by the publishers 112-1, 112-2 to 112-n.

The management system 104 can also analyze the content published by publishers 112-1, 112-2 to 112-n. The analysis can include recommendations of publishers to provide content, recommended responses to reviews, identifying a persona across multiple accounts, rating areas of emphasis and identifying user sentiment of attributes of the business. In some embodiments, the analysis can be customized based on a category of the business. Based on the analysis, the management system 104 can provide recommendations, statistics, identify areas of weakness and/or identify areas of competence. In some embodiments, the management system 104 can implement recommendations.

Publishers 112-1, 112-2 to 112-n can publish content that is accessed by end users 114-1, 114-2 to 114-n. In some embodiments, end users 114-1, 114-2 to 114-n provide content to publishers 112-1, 112-2 to 112-n to publish. Publishers 112-1, 112-2 to 112-n can include social media sites, websites, forums, review sites, etc. Some publishers 112-1, 112-2 to 112-n can allow interaction with content through APIs, such as receiving and/or transmitting content and/or notifications. As publishers 112-1, 112-2 to 112-n attract end users 114-1, 114-2 to 114-n, it can be desirable for a business representative to interact with end users 114-1, 114-2 to 114-n through publishers 112-1, 112-2 to 112-n.

In some embodiments, the management system 104 can assign publishers 112-1, 112-2 to 112-n to categories. Some publishers can be assigned to specific categories. Other publishers can be considered generically applicable. For example, a review website for aftermarket car parts can be assigned to a specific category of automotive and aftermarket retail. A popular social media site (e.g., Facebook.com™, Google+™, LinkedIn.com™), business listing site (e.g., yellowpages.com) or other publisher can be determined to be generically applicable to all or most categories. In some embodiments, the management system 104 can recommend to business representatives both generic publishers and category-specific customers.

When used herein, a category is a grouping of businesses that share common characteristics. Categories can include other categories (sometimes referred to as subcategories). For example, an automotive category can include all of an automotive parts dealer category. Categories do not have to be mutually exclusive, as a business can be assigned more than one category. For example, a computer repair shop can be assigned to a computer repair category and a computer parts retail category. An example of a set of categories can be a set of business listing categories in a phone book. Another example of a set of categories can be the NAICS™ (North American Industry Classification System).

Figure 2:
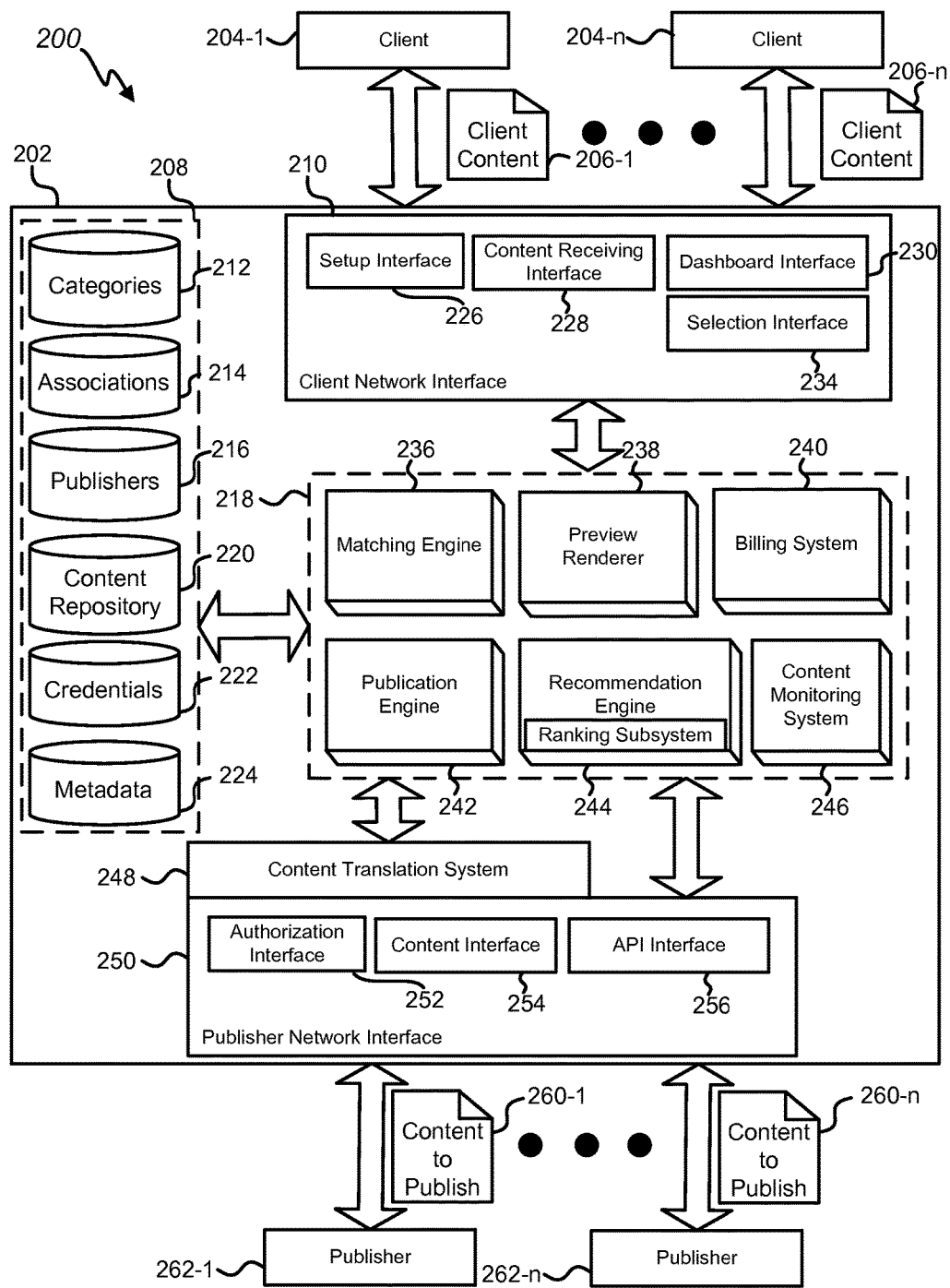
FIG. 2 depicts a block diagram of an embodiment of a management system configured for publisher matching.
Figure 3:
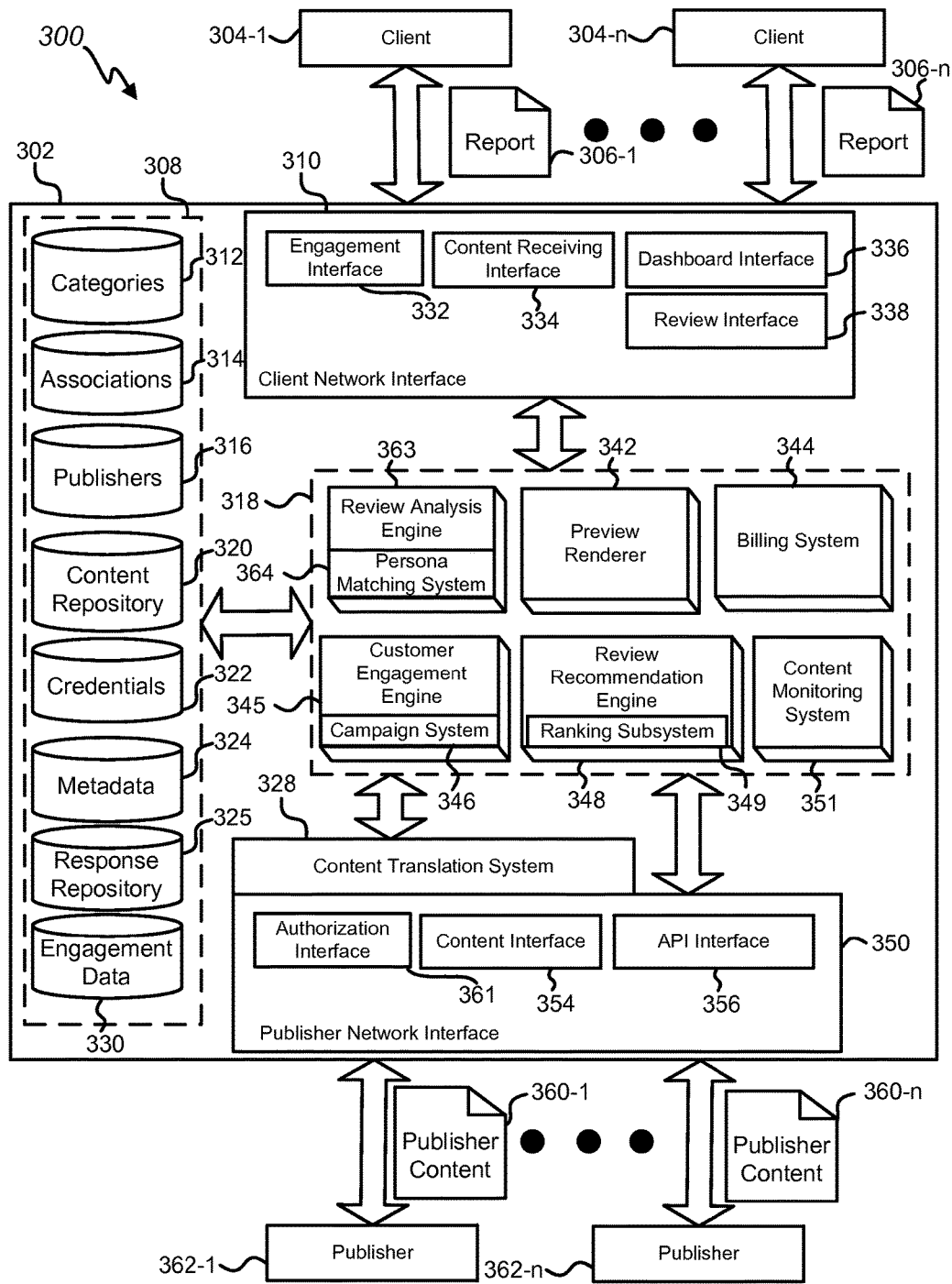
FIG. 3 depicts a block diagram of an embodiment of a management system configured for opportunity management.
Figure 4:
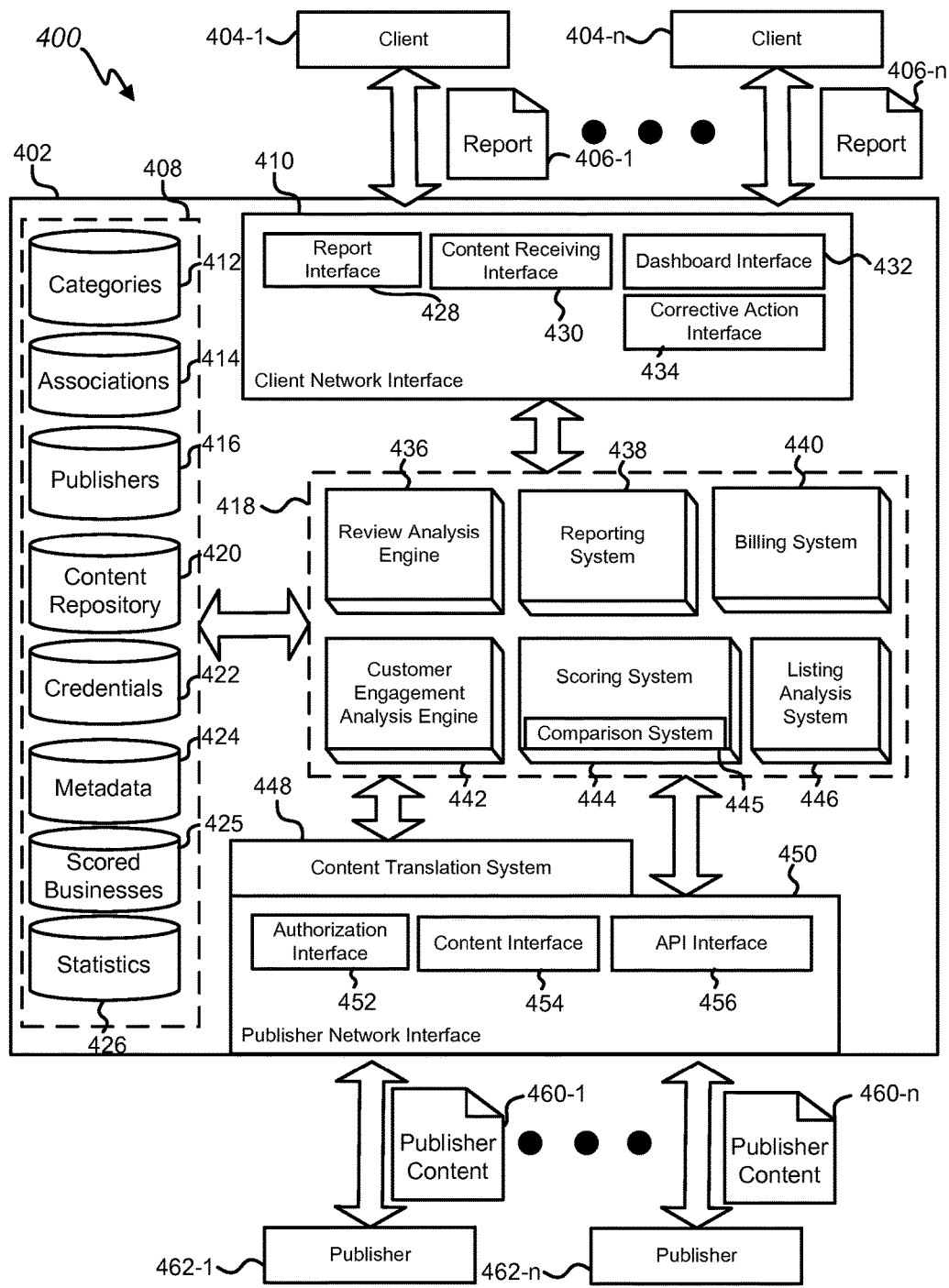
FIG. 4 depicts a block diagram of an embodiment of a management system configured for online business evaluation.
Figure 5:
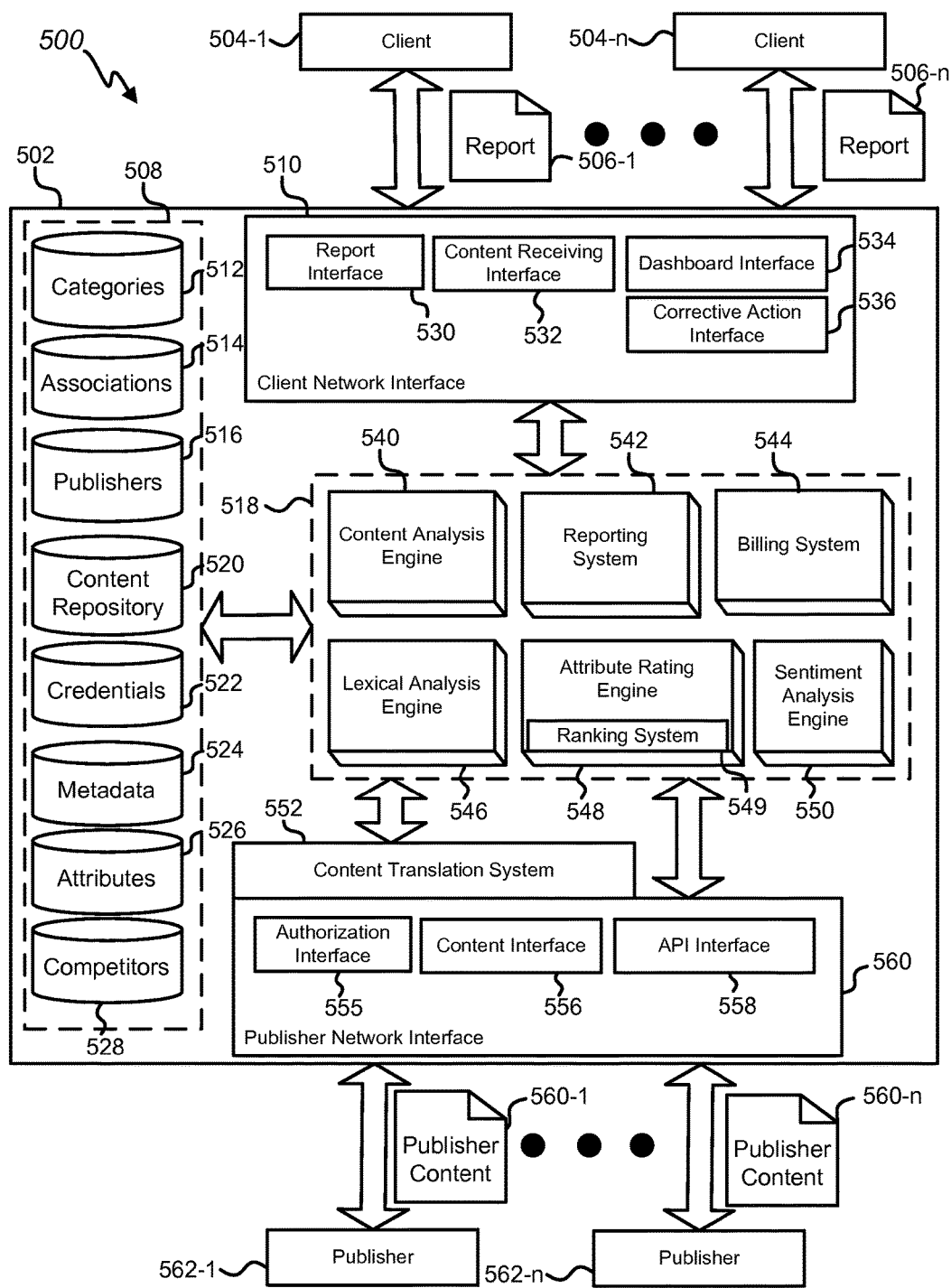
FIG. 5 depicts a block diagram of an embodiment of a management system configured for business attribute evaluation.

FIGS. 2 to 5 show embodiments of publisher management systems. FIG. 2 shows a publisher management system configured to select publishers, in accordance with certain embodiments of the present disclosure. FIG. 3 shows a publisher management system configured to recommend responses and interaction with customers. FIG. 4 shows a publisher management system configured to evaluate areas of emphasis. FIG. 5 shows a publisher management system configured to determine attributes and sentiment from publisher content.

FIG. 2 depicts a block diagram of an embodiment of a system 200 configured for business to publisher matching, in accordance with certain embodiments of the present disclosure. Client 204-1 provides uniquely identifying information of a business to management system 202. The management system 202 may provide publishing information (e.g., creating a business listing) for one or more publishers 262-1 to 262-*n* to the client 204-1. In some embodiments, the management system 202 may determine a category to which the business belongs. And, based on the category selected, the management system 202 recommends publishing information (e.g., creating a business listing) for one or more publishers 262-1 to 262-*n*.

After receiving a selection of publishers 262-1 to 262-*n*, the management system 202 determines a superset of content to request from client 204-1. Client 204-1 provides client content 206-1 to management system 202. Management system 202 can translate the client content 206-1 to content 260-1 to 260-*n* compatible with each publisher 262-1 to 262-*n*. Content 260-1 to 260-*n* can then be transmitted to matching publishers 262-1 to 262-*n*.

Management system 202 can include client network interface 210, engines 218, datastores 208 and publisher network interface 250. Client network interface 210 can communicate with clients 204-1 to 204-*n* and receive client content 206-1 to 206-*n*. The client network interface 210 can include interfaces to enable the management system functionality. The client network interface 210 can include a setup interface 226 that enables the management system 202 to receive unique identifying information of a business. The client network interface 210 can include a content receiving interface 228 that enables receipt of content for publishing by publishers 262-1 to 262-*n*. The client network interface 210 can include a dashboard interface 230 that enables clients 204-1 to 204-*n* to monitor publisher content and make changes to publisher content (e.g., add a new address, provide a new posting, etc.). The client network interface 210 can include a selection interface 234 that provides recommendations of publishers and receives selections of publishers. The client network interface 210 can include other client network interfaces 234 and can communicate using various protocols and APIs.

Management system 202 can include engines 218 that process information from datastores 208, client network interface 210 and publisher network interface 250. The management system 202 may include a recommendation engine 244. The recommendation engine 244 may be configured to provide a list of publishers retrieved from the associations datastore 214 and publishers datastore 216. A ranking subsystem 244 can order the list of publishers for recommendation to the client.

In some embodiments, the management system 202 may include a matching engine 236 that can receive unique business information and match the business to a category from category datastore 212. Based on the matched category, the recommendation engine 244 can provide a list of publishers associated with the category and generic publishers retrieved from the associations datastore 214 and publishers datastore 216. And, then the ranking subsystem 244 can order the list of publishers for recommendation to the client.

A publication engine 242 can receive a selection of publishers from client 204-1 and determine a superset of client content 206-1 to receive. The publication engine 242 can receive client content 206-1 and store it in content repository 220. A preview renderer 238 can use client content 206-1 to create a preview of how client content 206-1 would appear if published by publisher 262-1. When a preview is approved by a business representative, publication engine 242 can retrieve content from content repository 220, cause the content to be translated through translation system 248 and provide the content to publish 206-1 to 260-*n* to publishers 262-1 to 262-*n*. If needed, publication engine 242 can create accounts with publishers 262-1 to 262-*n* on behalf of client 204-1, store credentials in credential store 222 and use credentials to provide content to publish 260-1 to 260-*n* to publishers 262-1 to 262-*n*. Content monitoring system 246 can monitor publishers 262-1 to 262-*n* for changes to published content. Content changes can be reported back to client 204-1 by content monitoring system 246 with recommendations on fixing any problems. Publication engine 242 can implement recommendations by content monitoring system 246.

Billing system 240 can track usage, billing and/or authorization to use the management system. The billing system can bill businesses based on a number of publishers per month, each publisher interaction, for each service utilized and/or a monthly fee. The billing system can operate in conjunction with payment processors to enable billing and payment for services.

Management system 202 can include datastores 208. Data stores can include various forms of data storage including solid state storage, disk storage, databases (including relational, column, document, key-value and graph type databases) and cache. In some embodiments, the datastores 208 may include a category datastore 212 which can include information about categories and characteristics of businesses that can be identified as part of the category. The datastores 208 may include a publisher datastore 216 which can include information about publishers including content accepted, ranking information, etc. In some embodiments, the publisher datastore 216 may include category affinities, as well. The datastores 208 may include an association datastore 214 which can include information about client associations with publishers. In some embodiments, the association datastore 214 may include information about client associations with categories, as well. The datastores 208 may include a content repository 220 which can include content provided by client 204-1 to 204-*n* as well as translated content from content translation system 248. The datastores 208 may include a credential datastore 222 which can include credentials that are used on behalf of clients 204-1 to 204-*n* to access one or more accounts of publishers 262-1 to 262-*n*. Credentials can include username/passwords, tokens, certificates, etc. The datastores 208 may include a metadata datastore 224 which can include information about content, clients, publishers, data stored in datastores, log information, etc.

The management system 202 can include a publisher network interface 250 that communicates with publishers 262-1 to 262-*n*. The publisher network interface 250 can include an authorization interface 252 that uses credentials from credential datastore 222 to access publishers 262-1 to 262-*n* on behalf of clients 206-1 to 206-*n*. A content interface 254 can be configured to send and receive content to publishers 262-1 to 262-*n* on behalf of clients 206-1 to 206-*n*. API interface 256 can access publishers 262-1 to 262-*n* using APIs and provide API access to the management system 202 by publishers 262-1 to 262-*n*. The publisher network interface can receive content through a content translation system 248 when client content 206-1 does not match publisher requirements of content to publish 260-1.

The management system can be implemented by one or more computing resources. In some embodiments, monitoring system 202 can be implemented by a single server. In other embodiments, each engine can comprise a set of servers that interact with other servers through API calls (e.g., datastores 208, engines 218, client network interfaces 210, publisher network interfaces 250).

In one example, a car parts store representative uses a web-browser client 204-1 to connect to management system 202. The representative uses the setup interface 226 to provide a business name, address and product details. Recommendation engine 244 provides the representative with a list of publishers (e.g., Facebook.com™, Google Local Listings™, Yellowpages.com™ and LinkedIn.com™) from publisher datastore 216. In some embodiments, matching engine 236 may determine that the car parts store is part of an automotive category based on characteristics from category datastore 212, and recommendation engine 244 provides the representative with a list of publishers that match the category of automotive (e.g., autotrader.com) as well as generic publishers from publisher datastore 216. After the representative makes the selection, billing system 240 can require payment for the services requested (e.g., 10 publishers per month). Publication engine 242 can determine a superset of content needed for the 10 publishers selected, including hours, photographs, contact information, description and a list of representative products. Publication engine 242 can receive the client content 206-1, store it in content repository 220 and cause preview renderer 238 to provide a preview of the content to client 204-1. When approved, publication engine 242 causes any non-conforming content to be translated through content translation system 248 (e.g., resizing and reformatting pictures, translating formats of word processing documents, etc.). Publication engine 242 can receive credentials for access to publishers 262-1 to 262-*n* from client 204-1 or create them on behalf of the business and store the credentials in credential store 222. Using the credentials, publication engine 242 can use authorization interface 252, content interface 254 and/or API interface 256 to deliver content to publish 260-1 (e.g., hours, photographs, contact information, description and a list of representative products) to publishers 262-1 to 262-*n*. A content monitoring system 246 can ensure that the content continues to be correctly published. Corrections can be sent to the publication engine 242 to be corrected.

FIG. 3 depicts a block diagram of an embodiment of a management system 302 configured for opportunity management for clients 304-1 to 304-*n* using publishers 362-1 to 362-*n* and content 360-1 to 360-*n*, in accordance with certain embodiments of the present disclosure. Management system 302 determines that new publisher content 360-1 about a business is published by publisher 362-1. Based on an analysis of the publisher content 360-1, management system 302 provides options to client 304-1 on potential responses to publisher content 360-1. In some embodiments, the options could also be based on a category of the business. Positive publisher content 360-1 can be acknowledged and rewarded (e.g., coupons, thank you note, etc.). In some embodiments, the reward could be based on the category. Negative publisher content 360-1 can be requested to be removed (e.g., spam, negative competitor campaign, etc.) or minimized through positive interaction (e.g., apology, invitation to come back, etc.). In some embodiments, the handling of negative publisher content 360-1 could depend on the category.

The management system 302 can also provide customer engagement reminders. For example, the management system can remind a car parts dealer to post weekly to each publisher 360-1 to 360-*n*. The management system 302 can also remind business representatives of important dates to start campaigns. In some embodiments, the customer engagement reminders could be based at least in part on categories. For example, a local chocolate confectioner can be reminded to run a coupon near Valentine's Day, while an automotive parts dealer can be reminded to run specials around the Fourth of July.

Management system 302 can include client network interface 310, engines 318, datastores 308 and publisher network interface 350. Client network interface 310 can include engagement interface 332, content receiving interface 334, dashboard interface 336 and review interface 338. Engagement interface 332 can present response options (e.g., apology, offer, comment, campaign, etc.) to a business representative for responding to new publisher content 360-1. Engagement interface 332 can also provide campaign options as determined by customer engagement engine 346 to keep the representative performing customer engagement. In some embodiments, this could be based at least in part on the category of the business. Content receiving interface 334 can receive content from client 304-1 to 304-*n*. A dashboard interface 336 can provide information about customer engagement and new publisher content 360-1 for review, response and/or implementation. Review interface 338 can provide information about publisher content 360-1 along with recommendations in responding to publisher content 360-1.

Engines can include review analysis engine 363 with persona matching system 364, preview renderer 342, billing system 344, customer engagement engine 345 with campaign system 346, review recommendation engine 348 with ranking subsystem 349 and content monitoring system 351. Review analysis engine can perform an analysis of publisher content 360-1 to determine a response to publisher content 360-1. The analysis can include lexical analysis, sentiment analysis, metadata determination, terms of use violations, etc. Based on the analysis, the review recommendation engine can provide one or more suggested responses to publisher content 360-1. The suggested responses can include public responses (e.g., apologies, thanks, etc.), private responses (e.g., direct message), offers (e.g., coupons, vouchers, etc.), publisher requests (e.g., take down for terms of use violation, spam, etc.) or other actions. In some embodiments, one or more suggested responses could be based at least in part on a category of the business. Responses and text of proposed responses can depend on business category (e.g., a luxury retailer may not give a coupon, but an offer of a meeting with a manager) and be retrieved from response repository 325. Ranking subsystem 349 can organize proposed responses based on potential of successful outcome (e.g., a takedown may not have much success, and so it is ranked lower). In some embodiments, proposed responses may be organized based at least in part on category. Preview renderer 342 can provide a preview of the response before the response is implemented (e.g., show a comment before it is posted).

Customer engagement engine 345 can use engagement information from engagement datastore 330, to provide reminders and proposals for a business representative to implement. Engagement engine 345 can remind representatives to publish content 360-1 to 360-n through publishers 362-1 to 362-n. The content can include campaign information from campaign system 346. By reminding the representative to engage customers through publishers 362-1 to 362-n, the representative can keep the business at a forefront of customers' minds using publishers and content. In some embodiments, customer engagement engine 345 can use category-specific engagement information to provide reminders and proposals for a business representative to implement based on the category of business. Further, campaigns can be implemented at strategic times of the year to keep customers coming to the business, and, in some embodiments, the strategic times of the year could be tailored to a business category. Engines can use the authorization interface 361 to use business credentials to interact with publishers 362-1 to 362-n on behalf of the business.

Management system 302 can include datastores 308 as described above. In addition, management system 302 can include a response repository that includes potential responses as related to categories and/or analysis attributes (e.g., spam, positive, negative). In some embodiments, engagement data 330 can include customer engagement information as it relates to business categories. For example, a chocolatier may need more frequent social media posts to keep customers hungry for the chocolate, than an automotive parts store does to entice purchase of an exciting aftermarket part.

Content from engines 318 can be provided to publishers 362-1 to 362-n as described above through publisher network interface 350. The publisher network interface can also add tracking information for aiding in statistics and persona identifications. For example, a publisher network interface can modify content to use a unique identifier (e.g., a unique link) that identifies traffic (e.g., traffic from the publisher, traffic from a user, etc.).

The management system 302 can include persona matching system 364. Persona matching system 364 can identify a common user behind multiple publisher 362-1 to 362-n accounts. In one embodiment, the persona identification system can determine that accounts share a persona when a threshold value of characteristics is exceeded. For example, a persona matching system can perform matching on lexical analysis of content from reviews, review metadata for similarities (e.g., IP address, camera information, username). Tests can also be performed to confirm a persona (e.g., sending tracking information such as a tracked picture, providing an offer that requires the shared accounts, etc.). Should enough characteristics match, the accounts can be considered operated by a single persona. By identifying a shared persona, public campaigns can be identified and stopped or encouraged, depending on the type of campaign.

For example, management system 302 through content monitoring system 351 can identify two new negative reviews published by two different publishers. Review analysis engine can determine characteristics of the reviews, including identifications of the customer's unsatisfactory treatment by a salesperson and a foreign IP address. Persona matching system 364 can detect a common negative tone, word choices and a common IP address that resolves to a foreign IP address. Persona matching system 364 can determine that the reviews share a common persona. Review recommendation engine 348 provides recommendations that include a request for take down and an apology with an invitation to return with a discount. A report 306-1 can be issued to client 304-1 through review interface 338 that includes the recommendations and notification of the reviews. The review interface 338 can receive instructions to perform the take down request. Review recommendation engine 348 can implement the requested take down through API interface 356 to publisher 362-1. Content monitoring system 351 can then monitor the results of the take down request, if any. Billing system 344 can charge for services performed.

Report 306-1 can also include recommendations from customer engagement engine 345. For example, in accordance with certain embodiments, recommendations can include providing two posts on two mini-blog services and a campaign for an end of school sale, due to the business category's determined relationship with schools (e.g., skateboard shop) and frequent use of mini-blog services by customers.

Management system 302 can also include systems as described in prior figures (e.g. FIG. 2). Datastores can include functionality as described in relation to prior figures (e.g. FIG. 2, including any one or combination of categories datastore 312, associations datastore 314, publishers datastore 316, content repository 320, credentials datastore 322, and/or metadata datastore 324. Publisher network interface 350 can include authorization interface 361, content interface 354 and API interface 356.

FIG. 4 depicts a block diagram of an embodiment of a system 400 configured for online business evaluation using publishers 462-1 to 462-n and content 460-1 to 460-n, in accordance with certain embodiments of the present disclosure. The management system 402 can collect and analyze publisher content 460-1 to 406-n from publishers 462-1 to 462-n about businesses. The businesses can be evaluated according to areas of emphasis. In some embodiments, the areas of emphasis can be different for each category. Ratings of a business can be provided in a report 406-1 to client 404-1. In some embodiments, the report 406-1 can also include category averages of the ratings to provide a baseline understanding of competition. The report 406-1 can also include ratings of competitors to determine areas that are in need of improvement and areas that provide a potential competitive advantage.

Areas of emphasis can include generic and/or category-specific ratings. A set of ratings can include any one or combination of fan ratings (e.g., followers, likes, etc.), interaction rating (e.g., business posts, customer posts about the business and conversations with customers), search rating (e.g., search engine result page rank, keywords, etc.), ad success rating (conversion rate, impressions, etc.), buzz rating (e.g., news mentions, PR mentions, etc.) and/or satisfaction rating (e.g., review sentiment, star ratings, review site ratings, multiple reviews by a single persona, etc.). In some embodiments, recommendations can be given to increase ratings. In one embodiment, data used to determine the rating can be seen (e.g., number of followers, number of post likes, etc.) when the rating is selected for explanation (e.g., clicking on a hyperlink to show a support page for the rating).

Management system 402 can include client network interface 410, engines 418, datastores 408 and publisher network interface 460. Client network interface 410 can include interfaces as described above in relation to FIGS. 2-3. In addition, report interface 428 can provide area of emphasis ratings of the business. In some embodiments, report interface 428 can also provide area of emphasis ratings of competitors and/or categories of the business. Corrective action interface 434 can provide suggested actions to increase ratings of areas of emphasis. Corrected action interface 434 can receive approved actions and cause engines from FIGS. 2-3 to implement the actions. In some embodiments, dashboard interface 432 can display a summary comparison of the business compared with competitors and/or the category as a whole. Dashboard interface 432 can link to corrective action interface 434 and/or other interfaces 428 and/or 430 to act upon the summary information.

Engines can include review analysis engine 436, customer engagement analysis engine 442, listing analysis system 446, scoring system 444 with comparison system 445, reporting system 438 and billing system 440. Review analysis engine 436 can analyze publisher content 460-1 to 460-n that includes review information to provide statistics that include sentiment rating, star rating, numerical rating, attribute rating, etc. Customer engagement analysis engine 442 can analyze publisher content 460-1 to 460-n representing interactions with customers to determine statistics regarding publisher content 460-1 to 460-n. In one embodiment, the statistics gathered are based at least in part on publisher specific criteria (e.g., likes are counted on social websites, comments are counted on company blogs, etc.) to prepare a group of statistics. Statistics can be stored in statistics datastore 426. Listing analysis system 446 can analyze publisher content 460-1 to 460-n representing business listings and mentions (e.g., search engine ranking, press release mentions, news articles, etc.) to prepare a group of statistics.

Scoring system 444 can retrieve statistics from statistics store 426 and prepare a set of ratings for areas of emphasis. In some embodiments, this can be based at least in part on a determined business category. Using statistics gathered by review analysis engine 436, customer engagement analysis engine 442 and listing analysis system 446, scoring system 444 can prepare ratings for a business of areas of emphasis (e.g., business marketing tasks, business engagement efforts, etc.), which, in some embodiments, could be related to a category of the business. In some embodiments, the formula used to calculate ratings can depend on the category (e.g., an exterminator may need to interact with potential customers more frequently than a roofer). The scoring system 444 can repeat the ratings for multiple businesses in a category to determine competitor scores and average category values for ratings. The scores can be stored in scored business datastore 425. A comparison system can help identify areas of improvement and competitive advantages. The comparison system can also provide recommendations to capitalize on the competitive advantages (e.g., create a post lauding the company for high ratings) and to improve low areas (e.g., increase frequency of social media interaction).

Reporting system can provide reports 406-1 to 406-n of scores to keep a business representative updated on progress. Reports 406-1 to 406-n can include suggested actions and/or reminders of actions to implement to achieve higher ratings. The reports can include links to interfaces to help perform and/or approve the actions.

Billing system 440 can manage payment, authorization and use of services. In one embodiment, billing system 440 can require payment before use of a service or implementation of suggestions.

Datastores 408 and publisher network interface 450 can operate as described in conjunction with FIGS. 2-3. The publisher network interface 450 can also use API interface 456 to receive notifications of new publisher content 460-1 to 460-n.

Management system 402 can also include systems as described in prior figures (e.g. FIG. 2). Datastores can include functionality as described in relation to prior figures (e.g. FIG. 2, including any one or combination of categories datastore 412, associations datastore 414, publishers datastore 416, content repository 420, credentials datastore 422, and/or metadata datastore 424. Publisher network interface 450 can include authorization interface 452, content interface 454 and API interface 456. If content translations are necessary, content can first be presented to content translation system 448 before sending content through publisher network interface 450.

FIG. 5 depicts a block diagram of an embodiment of a management system 500 configured for business attribute evaluation using publishers 562-1 to 562-n and content 560-1 to 560-n. Publishers 562-1 to 562-n can publish content 560-1 to 560-n (including user generated reviews) that describe experiences with a business, in accordance with certain embodiments of the present disclosure. Management system 502 can analyze content 560-1 to 560-n for attributes and sentiment about the attributes. The attributes can be aggregated and then reported to a business representative. By determining attributes and sentiment about the attributes, management system can help a business representative discover more about a customer's experience and focus. The analysis can be repeated for other businesses. In some embodiments, a report to the business representative can include attributes and sentiment related to competitors and/or a business category in aggregate. For example, a car dealership can have a positive attribute for truthfulness, while competitors and the category have a negative sentiment for truthfulness. This attribute for truthfulness can be a competitive advantage in advertising, especially with support from linked publisher content 560-1 to 560-n.

Management system 502 can include client network interface 510, engines 518, datastores 508 and publisher network interface 560. The client network interface can include interfaces described in FIGS. 2-4, including corrective action interface 536 that is configured to provide recommendations to fix the determined negative attributes. In some embodiments, online publisher correction recommendations can be implemented by management system (e.g., hard to find address attribute can be corrected through additional business listings using keywords from customer searches).

Engines 518 can include content analysis engine 540, lexical analysis engine 546, sentiment analysis engine 550, attribute rating engine 548 with ranking system 549, reporting system 542 and billing system 544. Content analysis engine 540 can identify publisher content 560-1 to 560-n that includes customer experiences with a business. Lexical analysis engine 546 can process the identified content to determine attributes identified in the customer experiences. Sentiment analysis engine 550 can determine customer sentiment about the identified attributes. Attributes and sentiment can be stored in attribute datastore 526 and associated with the business. Attribute rating engine 549 can compile the attributes with sentiment and provide a summary of customer impressions of the business attributes with sentiment. Ranking system 549 can identify strong customer sentiments and/or frequently identified sentiments. The analysis can be repeated for other businesses, which in some embodiments could be in the same category, including competitors to the business. Strong competitors can be identified and stored in competitor datastore 528. Reporting system 542 can provide a summary of attributes with sentiment about any one or combination of the business, competitors, and/or the category in general.

Billing system 544 can manage payment, authorization and use of services as described in FIGS. 2-4. In some embodiments, billing system 544 can charge for each access to a service.

Datastores 508 and publisher network interface 560 can operate as described in conjunction with FIGS. 2-3. The publisher network interface 560 can also use API interface 558 to receive notifications of new publisher content 562-1 to 562-*n*.

In one embodiment, a customer writes a review about a doughnut shop and publishes it on a review website. The review website notifies management system 502 of the new review via API interface 558. Content analysis engine 540 filters review information to provide a text of the review to lexical analysis engine 546. Lexical analysis engine 546 can identify adjectives and nouns that describe the business. Lexical analysis engine 546 can determine attributes represented by the adjectives and nouns. Sentiment analysis engine 550 can review the context around the adjective and nouns to determine whether a positive, negative or neutral tone is used with the attribute. The results can be stored in a database of attributes and associated with the business. Reporting system 542 can create an updated report 506-1 to send to client 504-1.

Management system 502 can also include systems as described in prior figures (e.g. FIG. 2). Datastores can include functionality as described in relation to prior figures (e.g. FIG. 2, including any one or combination of categories datastore 512, associations datastore 514, publishers datastore 516, content repository 520, credentials datastore 522 and/or metadata datastore 524. Publisher network interface 560 can include authorization interface 555, content interface 556 and API interface 558.

Figure 6:
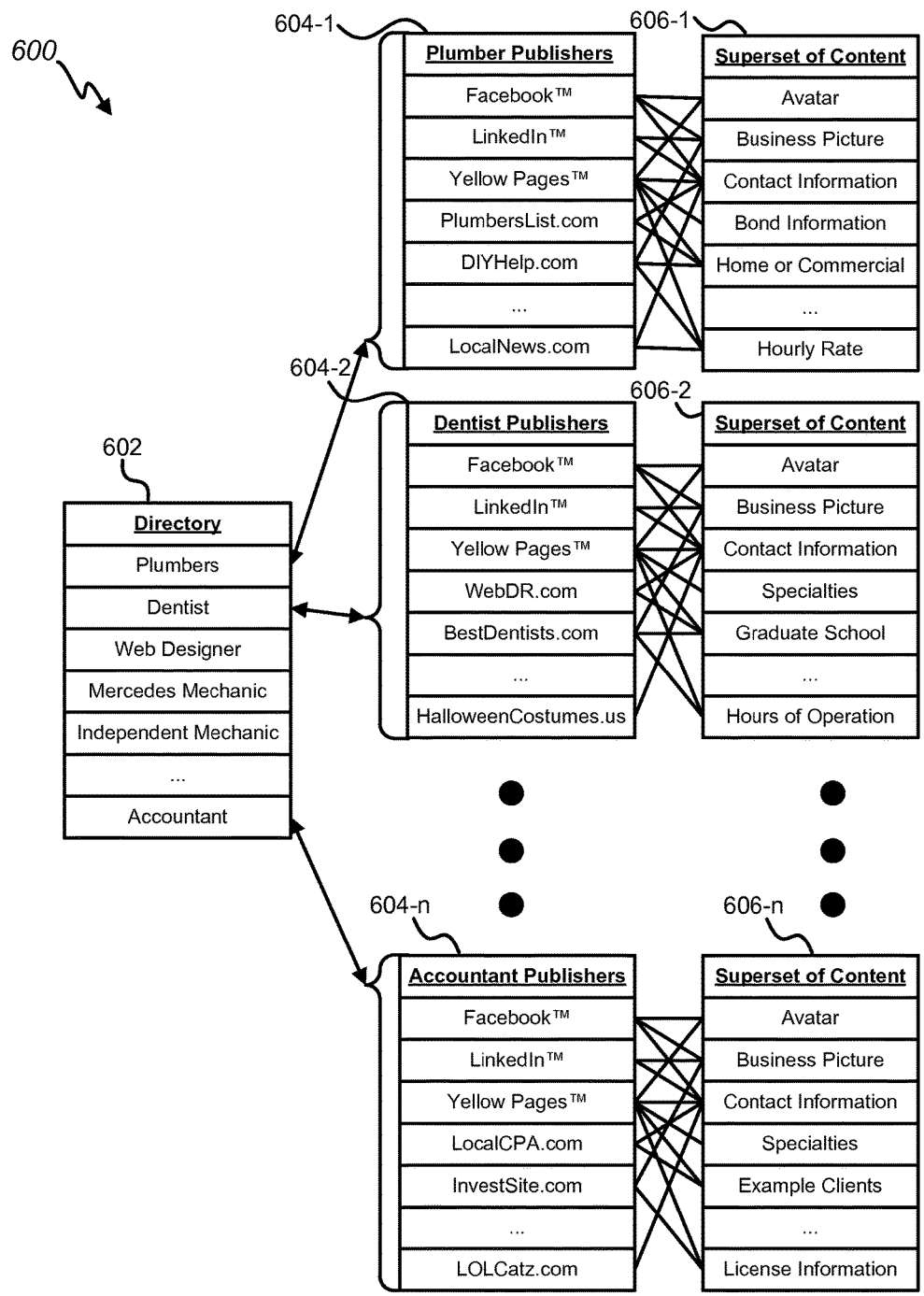
FIG. 6 illustrates a chart of an embodiment of a relationship between publishers and content.
Figure 7:
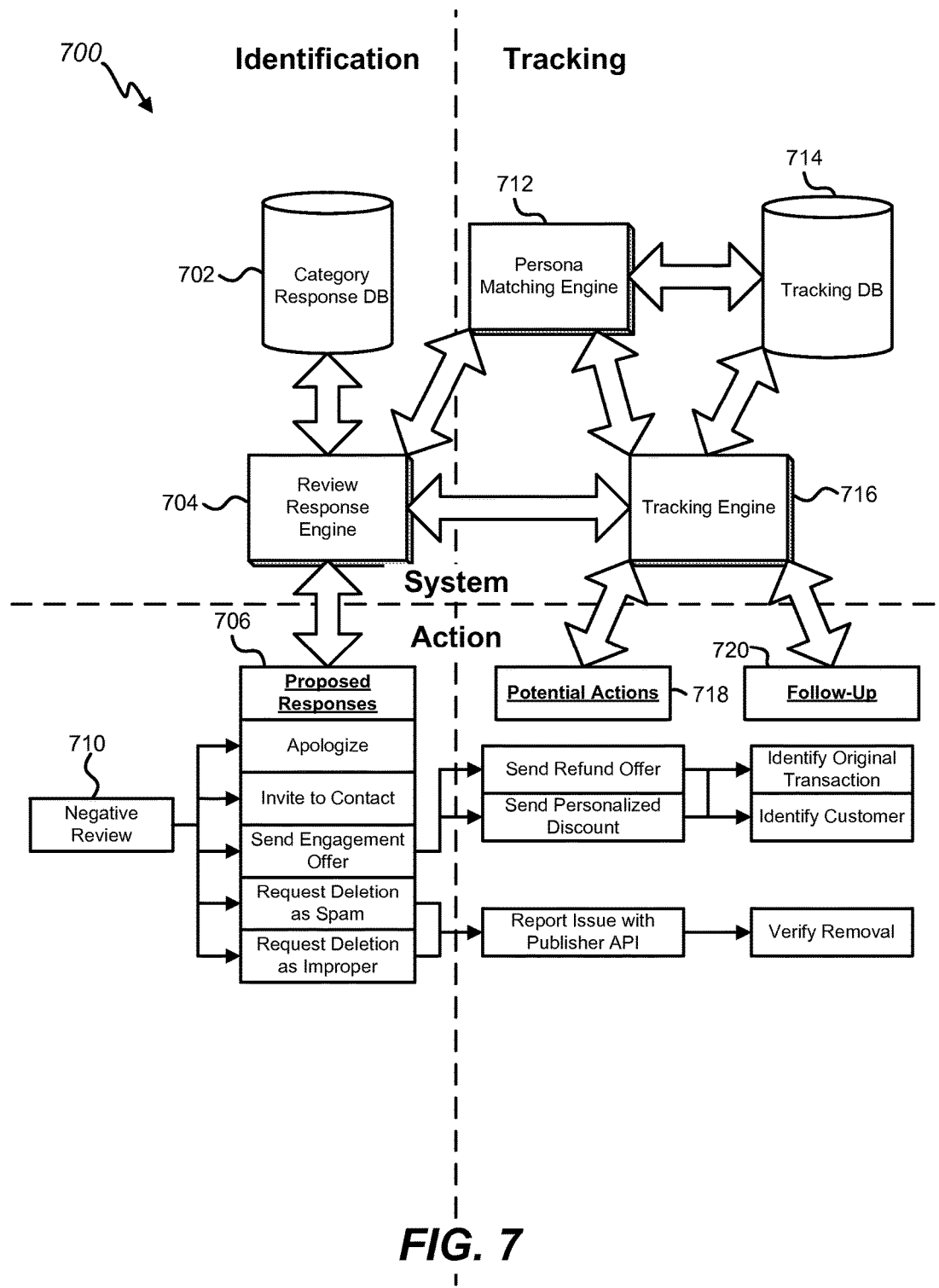
FIG. 7 illustrates a hybrid system and flowchart of an embodiment of a relationship between recommended engagement responses and publisher reviews.
Figure 8:
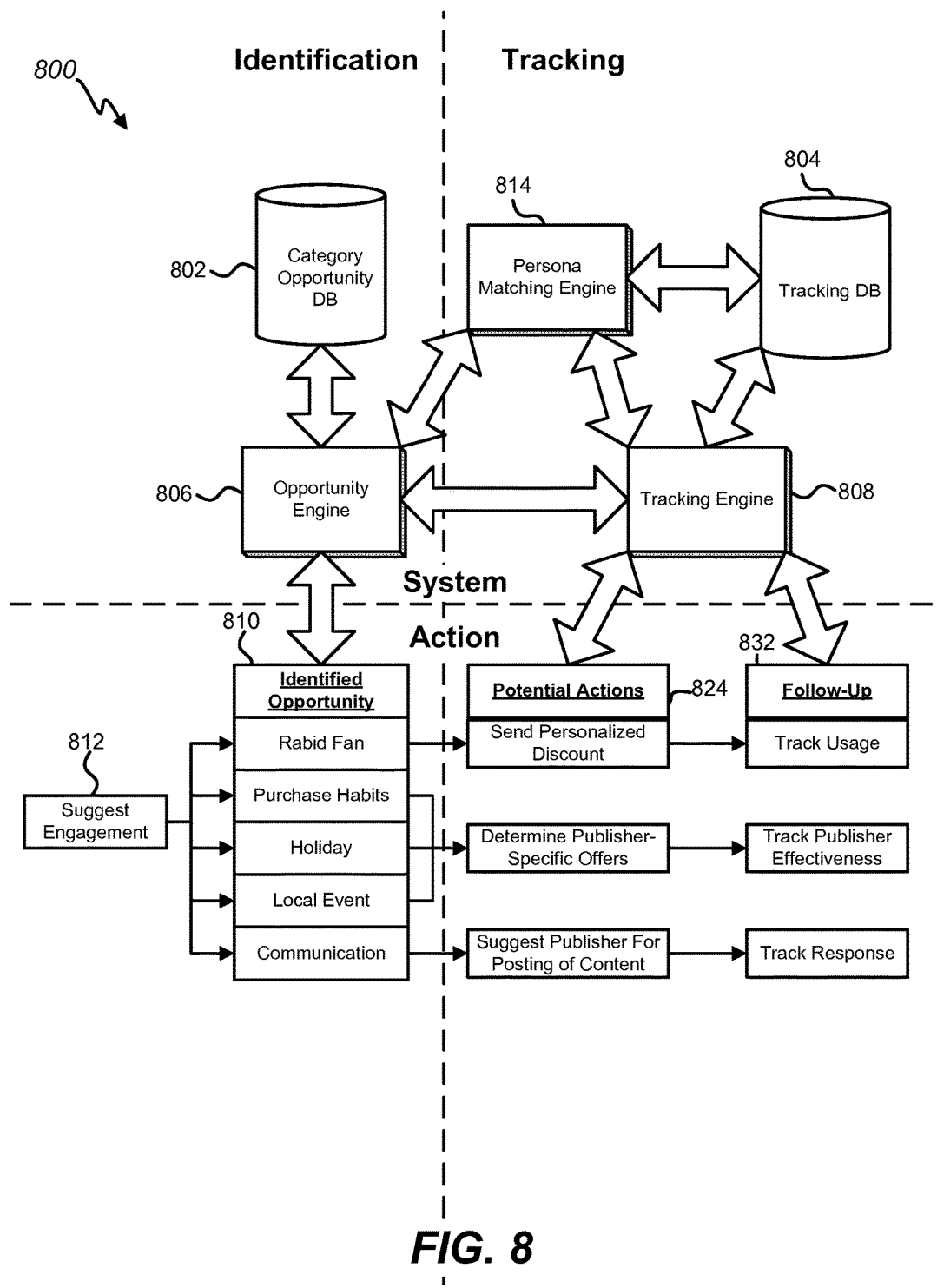
FIG. 8 illustrates a hybrid system and flowchart of an embodiment of a process for customer engagement recommendations.
Figure 9:
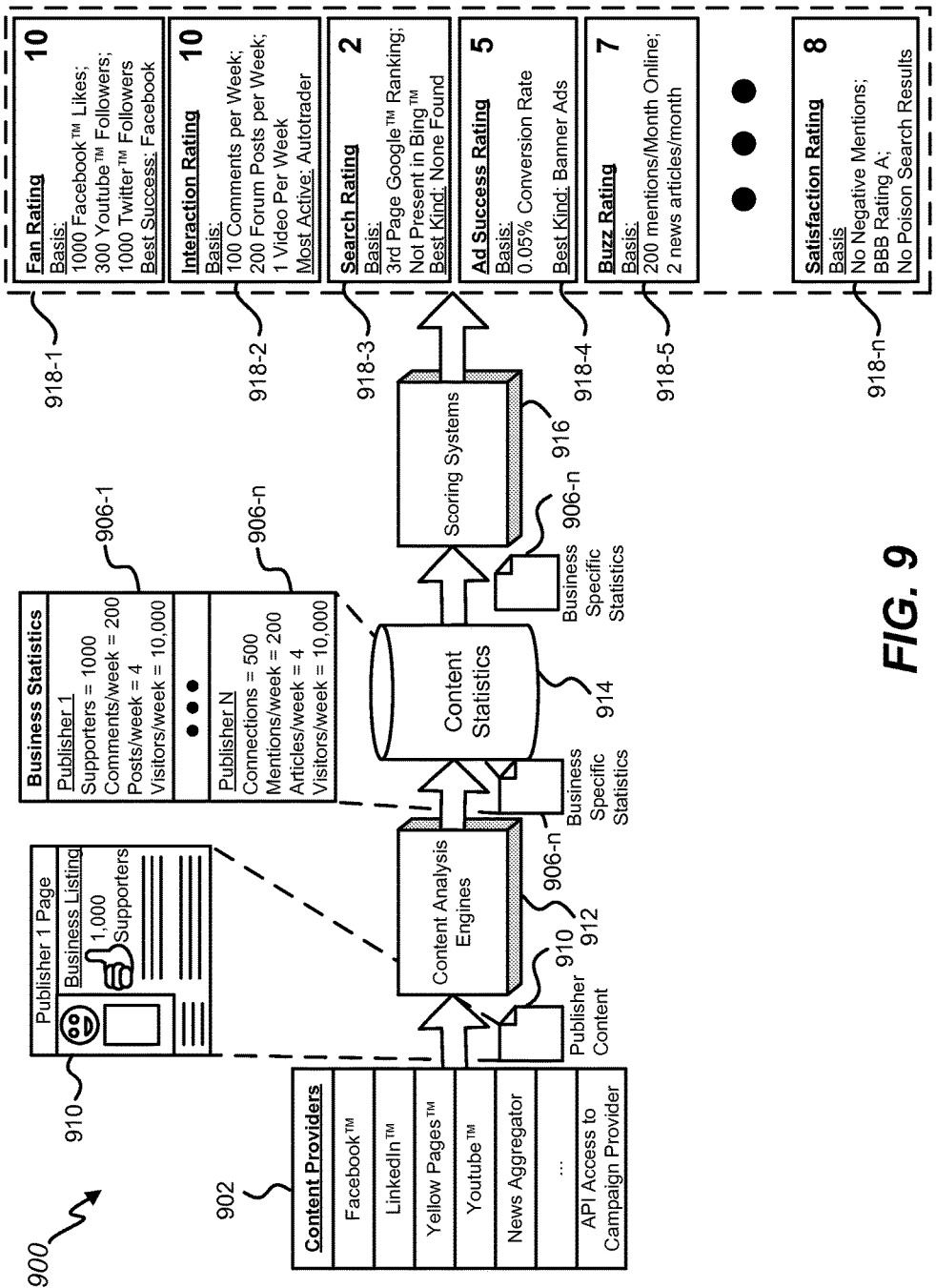
FIG. 9 illustrates data flow of an embodiment of a process for online business evaluation.
Figure 10:
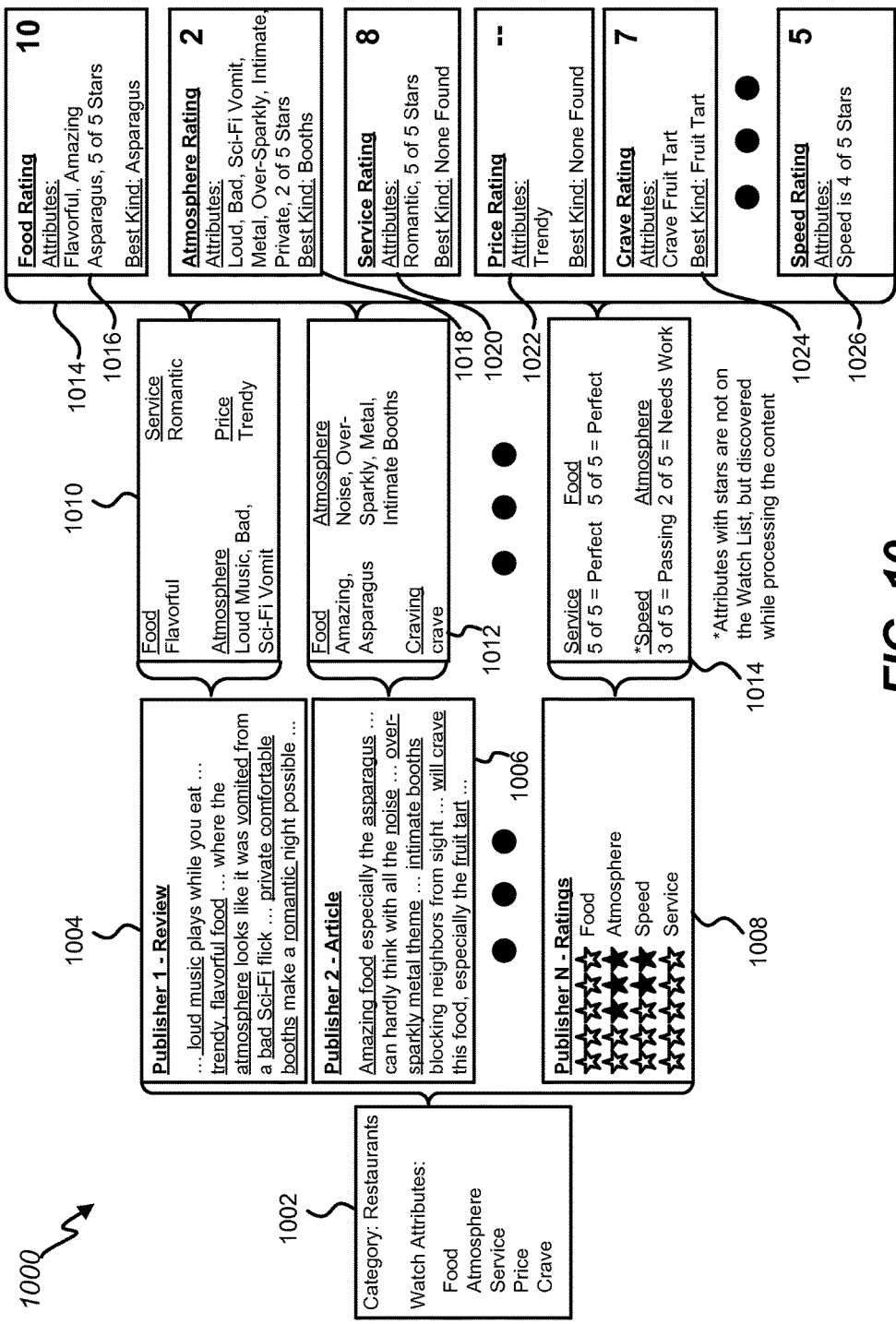
FIG. 10 illustrates data flow of an embodiment of a process for business attribute evaluation.

FIGS. 6 to 10 show data relationships, flow and associated systems. FIG. 6 shows relationships between a category, publishers and content, in accordance with certain embodiments of the present disclosure. FIG. 7 shows potential responses to a negative review, including follow-up, and the relationship of the responses to management systems. FIG. 8 shows opportunity identification and the relationship of the data flow to management systems. FIG. 9 shows data flow from content to ratings of areas of emphasis. FIG. 10 shows attribute identification from content and attribute sentiment analysis.

FIG. 6 illustrates a chart 600 of an embodiment of a relationship between publishers and content, in accordance with certain embodiments of the present disclosure. In some embodiments, each category from a directory 602 (i.e. a set of categories) can be associated with a set of publishers 604-1, 604-2 and 604-*n*. Each publisher can be able to receive one or more pieces of content. The pieces of content for a set of publishers can form a superset of content 606-1, 606-2 and 606-*n*. The superset of content 606-1, 606-2 and 606-*n* can then define what is needed to publish information about a business to publishers 604-1, 604-2 and 604-*n*.

A business may provide uniquely identifying information to a management system (e.g., management system 202 in FIG. 2). The management system can provide a list of publishers. In some embodiments, the management system matches the business to a category with which the business and category share common attributes (e.g., a tax service can be associated with an accountants category). Based on this match, the management system can provide a list of publishers that have been determined to include audiences relevant to the category.

Content acceptable by the list of publishers can be gathered into a list of content needed by the management system for publishing to the publishers. This list of content can be duplicated so that repetition of content is avoided (e.g., a small version of an image in a first file format and larger version of an image in a second file format can be condensed into a larger version of an image in any one of multiple formats). This superset of content can then be requested from a representative of the business. Upon receiving at least a portion of the superset of content, the management system can publish the portion of content through one or more publishers. If needed, content can be translated from one format to another by the management system.

For example, a business representative provides a management system uniquely identifying information of a business name "Joy of Teeth," an address "123 North Street, San Francisco, Calif. 94103," and a product summary of "preventative service and maintenance of human teeth." The management system can then retrieve a list of publishers 604-2. According to certain embodiments, using the uniquely identifying information, the management system can match the business to a category of dentist, and the management system can then retrieve a list of publishers 604-2 associated with the category of dentist.

The management system can then compile the superset of content 606-2 to request from the business representative. The management system can determine that the Facebook™ publisher requires an avatar image, picture of the business and contact information (as seen by the lines between 604-2 and 606-2). The LinkedIn™ publisher requires a business picture and contact information (as seen by the lines between 604-2 and 606-2). The Yellow Pages publisher requires an avatar, contact information, specialties, graduate school information and hours of operation (as seen by the lines between 604-2 and 606-2). The WebDR.com publisher requires contact information and graduate school information (as seen by the lines between 604-2 and 606-2). The BestDentists.com publisher requires a business picture, graduate school and hours of operation (as seen by the lines between 604-2 and 606-2). The HalloweenCostumes.us publisher requires only contact information (as seen by the lines between 604-2 and 606-2). Based on these determinations, the management system can compile a superset of content 606-2 that includes an avatar, business picture, contact information, specialties, graduate school and hours of operation content. This superset of content can be requested and received by the management system from the business representative. Once received, the management system can store the content. The stored content can then be provided to the publishers and translated if needed. The management can then cause the publishers to publish the received content and monitor the content to ensure the integrity of the content.

In another example, a business representative provides a management system uniquely identifying information of a business name "Water Works," an address "123 South Street, San Francisco, Calif. 94103," and a product summary of "plumbing and HVAC services." The management system can then retrieve a list of publishers 604-1. According to certain embodiments, using the uniquely identifying information, the management system can match the business to a category of plumber, and the management system can then retrieve a list of publishers 604-1 associated with the category of plumber.

The management system can then compile the superset of content 606-1 to request from the business representative. The management system can determine that the Facebook™ publisher requires an avatar image, picture of the business and contact information (as seen by the lines between 604-1 and 606-1). The LinkedIn™ publisher requires a business picture and contact information (as seen by the lines between 604-1 and 606-1). The Yellow Pages publisher requires an avatar, contact information, bond information, home or commercial designation and hourly rate (as seen by the lines between 604-1 and 606-1). The PlumbersList.com publisher requires contact information and home or commercial designation (as seen by the lines between 604-1 and 606-1). The DIYHelp.com publisher requires a business picture, home or commercial designation and hourly rate (as seen by the lines between 604-1 and 606-1). The LocalNews.com publisher requires only contact information and hourly rate (as seen by the lines between 604-1 and 606-1). Based on these determinations, the management system can compile a superset of content 606-1 that includes an avatar, business picture, contact information, bond information, home or commercial designation and hourly rate. This superset of content can be requested and received by the management system from the business representative. Once received, the management system can store the content. The stored content can then be provided to the publishers and translated if needed. The management can then cause the publishers to publish the received content and monitor the content to ensure the integrity of the content.

In another example, a business representative provides a management system uniquely identifying information of a business name "CPA 4 You," an address "123 West Street, San Francisco, Calif. 94103," and a product summary of "tax, forensic accounting and payroll services." The management system can then retrieve a list of publishers 604-*n*. According to certain embodiments, using the uniquely identifying information, the management system can match the business to a category of accountant, and the management system can then retrieve a list of publishers 604-*n* associated with the category of accountant.

The management system can then compile the superset of content 606-*n* to request from the business representative. The management system can determine that the Facebook™ publisher requires an avatar image, picture of the business and contact information (as seen by the lines between 604-*n* and 606-*n*). The LinkedIn™ publisher requires a business picture and contact information (as seen by the lines between 604-*n* and 606-*n*). The Yellow Pages publisher requires an avatar, contact information, specialties, example clients and license information (as seen by the lines between 604-*n* and 606-*n*). The LocalCPA.com publisher requires contact information and example clients (as seen by the lines between 604-*n* and 606-*n*). The InvestSite.com publisher requires a business picture and license information (as seen by the lines between 604-*n* and 606-*n*). The LOLCatz.com publisher requires only contact information (as seen by the lines between 604-*n* and 606-*n*). Based on these determinations, the management system can compile a superset of content 606-*n* that includes an avatar, business picture, contact information, bond information, home or commercial designation and hourly rate. This superset of content can be requested and received by the management system from the business representative. Once received, the management system can store the content. The stored content can then be provided to the publishers and translated if needed. The management can then cause the publishers to publish the received content and monitor the content to ensure the integrity of the content.

In various embodiments, the list of publishers (which, in some embodiments, are associated with a category) can be determined by multiple methods. In some embodiments, the list of publishers is input by a user. In some embodiments, a demographic assessment can be used to determine sites. In some embodiments, sites can be added to or removed from the list of publishers based on successes seen by other clients. For example, if a business representative adds a site as a publisher, the management system can gather statistics (e.g., conversions, campaign successes, traffic, etc.) on the publisher and determine that the site is useful to recommend to other businesses (which, in some embodiments, may be associated with the same or similar categories). For example, it may have been unobvious to associate the accountant category from directory 602 with a LOLCatz.com publisher in account publishers 604-*n*. However, there may be an unknown correlation between people searching for accountants and a desire for humor that becomes known after a first accountant requests the management system to add the publisher to their stable of publishers.

FIG. 7 illustrates a hybrid system 700 and flowchart of an embodiment of a relationship between recommended engagement responses and publisher reviews, in accordance with certain embodiments of the present disclosure. When negative review 710 is detected, review response engine 704 can analyze the review. Based on the analysis, review response engine 704 can retrieve suggested responses 706 from response database 702. And, in some embodiments, review response engine 704 can use a business category to retrieve suggested responses 706 from response database 702, which may have responses associated with categories. A business representative can select one or more of the proposed responses 706 to respond to the negative review 710 or refuse to further respond. Tracking engine 716 can monitor actions 718 performed by the review response engine 704 and can include tracking information in actions performed. Tracking engine 716 can use tracked actions to identify a customer, identify a transaction or verify removal of a review. Tracking information and identities can be stored in tracking database 714.

In some embodiments, the review response engine 704 and/or tracking engine 716 can use a persona matching engine 712 to determine if a user behind an account that posted a review shares a common persona (e.g., a same person wrote both reviews). The persona matching engine can use lexical analysis (e.g., word choice, writing level, common mistakes, etc.), post metadata (e.g., IP address, account name, etc.) and other review information to determine a strong enough correlation of a same persona (e.g., characteristics ratings exceed a threshold). If a common person is found, prior interactions with other accounts can influence the determination of proposed responses (e.g., labeling as spam instead of sending an engagement offer).

For example, a management system can determine new negative review 710 was posted. Review response engine 704 can analyze negative review 710 for content (e.g., find the complaint within the negative review, tone, etc.) and metadata (e.g., IP address, time of posting, etc.). Using the analysis, persona matching engine 712 can attempt to match the review to other reviews to determine more information about the reviewer (e.g., a serial complainer who attempts to get free stuff, a generally positive reviewer who had a bad experience, etc.). Based on the analysis and determined persona, review response engine 704 can retrieve potential responses 706 from response database 702.

Proposed responses 706 can include responding to the reviewer with a public apology, or a private invitation to contact a business representative, and/or by sending an engagement offer. A business representative can choose to send an engagement offer and select proposed action 718 to be implemented by review response engine 704 and tracking engine 716. The engagement offer can include an offer for a refund and/or an offer for a discount. These actions can include tracking information placed by tracking engine 716 to determine effectiveness, use and/or identity of the reviewer. Tracking engine 716 can store tracking information in tracking database 714. Tracking engine 716 can also provide action information to persona matching engine 712, allowing persona matching engine 712 to match up two identities (e.g., accounts, etc.) to one persona. Tracking engine 716 can also provide follow-up actions 720. Examples of follow-up actions include identifying the original transaction for negative review 170 and identifying a customer providing negative review 710. Using this information, a customer can be identified for future reference (including special treatment or refusal of service).

Proposed responses 706 can also include publisher requests to delete the post as spam, improper and/or a violation of the publisher terms of use. A business representative can choose to select publisher actions instead of directly interacting with the reviewer. The business representative can request the review response engine contact the publisher (e.g., through an API, through automated form submission, etc.) to report the defects of negative review 710 and/or request deletion. Tracking engine 716 can monitor submission and verify removal of negative review 710 during a follow-up 720. In some embodiments, persona matching engine 712 analyzes negative review 710 and provides evidence to be used in requests sent to the publisher.

Proposed responses, actions and follow-ups can be tailored according to a determined category of the business, in certain embodiments. In some embodiments, proposed responses can be tailored to a business category. For example, a suggested response from a hardware store can include a coupon, while a suggested response from a high-end restaurant can include an invitation to move to the front of the queue. In some embodiments, proposed response text can be provided based on the business category. For example, an apology for a hardware store may include a reference to low prices. However, an apology for a high-end restaurant may include text apologizing for falling short of their aim for a perfect dining experience. In some embodiments, the proposed responses 706 and potential actions 718 are ranked according to a factor (e.g., likelihood of success, likelihood of customer satisfaction, score etc.). In one embodiment, multiple proposed responses can be combined together. For example a hardware store can send an apology with an offer of a refund or a discount, while pursuing publisher removal.

FIG. 8 illustrates a hybrid system 800 and flowchart of an embodiment of a process for customer engagement recommendations, in accordance with certain embodiments of the present disclosure. Opportunity engine 806 can track and remind business representatives of opportunities to engage with customers (e.g., holidays, purchase habits, communication style, fandom, etc.). Opportunity engine 806 can retrieve information about opportunities from opportunity database 802. In some embodiments, the information may be about opportunities related to categories from opportunity database 802, which may have opportunity information associated with categories. Opportunity engine 806 can use data from opportunity database 802 in conjunction with publisher content to determine opportunities to engage with customers. Opportunity engine 806 can suggest engagement 812 with customers through identified opportunities 810. Identified opportunities can include rabid fans, purchase habits, holidays, local events and/or communication opportunities. Based on the identified opportunities (and, in some embodiments, business category), potential actions 824 can be suggested, including sending a personalized discount, sending publisher-specific offers and suggesting content to publish with a publisher. A business representative can request potential actions 824 be implemented by opportunity engine 806 in conjunction with tracking engine 808. Tracking engine 808 can add tracking information to potential actions 824 to enable personalization (e.g., one-time use, tracking, specific use, etc.). Tracking engine 808 can perform follow-up tasks 832 including tracking usage of discounts and offers, tracking effectiveness of publishers and tracking customer response to published content. Tracking information and tracking results can be stored in tracking database 804.

Opportunity engine 806 can operate in conjunction with persona matching engine 814 to determine additional opportunity information. Persona matching engine 814 can identify a plurality of content that likely originated from a persona (e.g., a user having multiple accounts, a public relations firm operating under a rulebook, a search engine optimization company working for a competitor, a competitor writing negative content about the business). Based on a persona matching engine 814 analysis, rabid fan personas can be identified across accounts. Audiences can be more accurately measured (e.g., a few rabid fans with many accounts can look like a crowd of fans).

Opportunity database 802 can be loaded with opportunities based on input and/or experiential data. In some embodiments, category opportunity data is entered by users familiar with the category. In some embodiments, category opportunity data is determined at least in part from historical analysis. For example, tracking engine 808 can determine that weekly postings on a blog provide a reasonable audience for outdoor retailers based on an amount of effort required.

FIG. 9 illustrates data flow of an embodiment of a process 900 for online business evaluation, in accordance with certain embodiments of the present disclosure. Publisher content 910 from content providers 902 can be analyzed by content analysis engine 912 to determine business specific statistics 906-1 to 906-$n$. In some embodiments, content analysis engine 912 can base the gathering of business specific statistics 906-1 to 906-$n$ on a determined category of the business. Business specific statistics 906-1 to 906-$n$ can be stored in content statistics datastore 914. Scoring systems 916 can retrieve business specific statistics 906-1 to 906-$n$. Scoring system 916 can use algorithms to determine ratings for areas of emphasis 918-1 to 918-$n$. In some embodiments, the algorithms may be category-specific. Areas of emphasis 918-1 to 918-$n$ can be selected on any suitable basis (in some embodiments, based on a business category).

For example, content analysis engine 912 can retrieve publisher content 910 from publishers 902 (e.g., Facebook™, LinkedIn™, Yellow Pages™, YouTube™, News Aggregators, Advertising Campaign Providers, etc.). Content analysis engine 912 can analyze publisher content 910 for business statistics 906-1 to 906-$n$ (which, in some embodiments, may be related to areas of emphasis of a business category). Business statistics can include likes, followers, comments, rankings, conversions, mentions, review ratings, etc. Statistics can be measured in frequency, volume, total, counts, average, median, maximums, minimums, summary statistics, individual measurements etc. Statistics 906-1 to 906-$n$ can be stored in content statistics database 914. Scoring system 916 can retrieve business specific statistics 906-1 to 906-$n$ from content statistics database 914. Using algorithms specific to areas of emphasis (and the business category, in some embodiments), scoring system 916 can determine ratings 918-1 to 918-$n$. Ratings can be stored, compiled and provided in reports about any one or combination of the business itself, competitors, and/or category averages (or other statistics like maximums, minimums, means, etc.).

Ratings can include fan ratings, interaction ratings, search rankings, ad success ratings, buzz ratings and satisfaction ratings. A fan rating 918-1 can be compiled from business specific statistics 906-*n* including Facebook™ likes, YouTube™ followers and Twitter™ followers. In one embodiment, a rating can be determined based on exceeding a threshold. In the embodiment shown, a threshold minimum of 1200 actions from a selection of Facebook™ likes, YouTube™ followers and Twitter™ followers can result in a score of 10. The thresholds can be changed based on a business category, according to some embodiments. In some embodiments, the thresholds are dynamically altered based on competitor statistics during the rated time period.

An interaction rating 918-2 can be compiled from content statistics including comments per week, forum posts per week and videos per week. In an embodiment, a rating can be determined based on an equation. In the embodiment shown, an interaction rating is calculated by the equation of:

$$\frac{CommentsPerWeek}{2} + \frac{ForumPostsPerWeek}{4} + VideoPosts = InteractionRating$$

Search ranking 918-3 can be compiled from search engine result page rankings. In some embodiments, a ranking can be determined by fitting statistics to a probability distribution (e.g., normal curve of competitors). In the embodiment shown, the business ranked 15th among 100 competitors. Fit to a normal curve and rounded to the nearest whole rating, the search rating is a2 out of 10.

Advertising success rating 918-4 can be determined based on a conversion rate. In an embodiment, a ranking can be determined by a single statistic. In the embodiment shown, a conversion rate statistic is multiplied by 100 and used as a rating with a ceiling of 10. The conversion rate of 0.05% results in advertising success rating 918-4 of 5.

Buzz rating 918-5 can include publisher mentions other than provided by the business representatives and media article mentions. In one embodiment, a rating can be determined by a maximum statistic. For example, buzz rating 918-5 can be based on a maximum perceived influence of a source of the mention. A mention in a major media can be worth a 9 or 10, while a mention in a trade magazine can be worth a 5. In the embodiment shown, a mention was made in a gaming magazine with very good circulation which is worth a 7 rating. Other media mentions were less than the 7 rating and so do not contribute to the rating.

Satisfaction rating 918-*n* can include review statistics and business ratings. In one embodiment, a rating can be an average of a set of normalized statistics (e.g., review ratings published by publishers). In the embodiment shown, the business has a BBB rating of A, a review of 4 of 5 stars and review rating of 70 out of 100 points. Scoring system 916 can normalize the scores to a 9 for the BBB rating, 8 for the star rating and 7 for the points rating. Averaging the normalized rating results in an 8 rating for scoring system 916.

Areas of emphasis selected for ratings can be based on a category of the business, in some embodiments. For example, a disaster cleanup category may not have a buzz rating, but a bakery category can have such a rating. Ratings calculations can also vary with each category. For example, a disaster cleanup can have a different calculation for fans (as they receive very little) compared to the bakery category.

FIG. 10 illustrates data flow of an embodiment of a process for business attribute evaluation, in accordance with certain embodiments of the present disclosure. With some embodiments, attribute evaluation engines, such as those found in engines 518 from FIG. 5, can use category information 1002 to determine general attributes important to the business category to help guide content analysis. Attribute evaluation engines can receive and analyze content including review 1004, article 1006 and rating 1008 to determine descriptions 1010, 1012 and 1014 of attributes of the business. Sentiment analysis of the descriptions can be used to determine positive, negative and/or neutral reactions to the determined business attributes. The attributes can be grouped together in general attributes 1016, 1018, 1020, 1022, 1024 and 1026 and rated based on the determined sentiment of attributes. A report of the attributes, sentiment and ratings can be sent to a business representative. Competitors and general sentiments (which can be of a pertinent category, in some embodiments) can also be determined and included in the report.

In the embodiment shown, an American fare restaurant is selected for evaluation. Category attribute information 1002 of restaurants includes general attributes of food, atmosphere, service, price and craving. Review 1004 is analyzed by attribute analysis engines from a publisher noting attributes 1010 of food (based on the noun food), atmosphere (based on the noun atmosphere and music), service (based on the adjective romantic) and price (based on the description of trendy). The food attribute includes the positive sentiment of flavorful. The service attribute includes the positive sentiment of romantic. The atmosphere attribute includes the negative sentiment of loud, bad and Sci-Fi vomit. These attributes and sentiments can be stored for later combination with attributes from other content.

Article 1006 from a publisher is analyzed by attribute analysis engines noting attributes 1012 of food (based on the food and asparagus nouns), atmosphere (based on the noise, booths and theme nouns) and craving (based on the crave verb and fruit tart noun). The food attribute includes the positive sentiment of amazing and the neutral sentiment of asparagus. The atmosphere attribute includes the positive sentiment of intimate and negative sentiment of noise and over-sparkly metal. The crave attribute includes the positive sentiment of crave. These attributes and sentiments can be stored for later combination with attributes from other content.

Rating 1008 can be analyzed by attribute analysis engines noting attributes 1014 of food, atmosphere speed and service based on the attribute ratings. Sentiment analysis can determine customer reactions to the attributes based on the star ratings. Service and food attributes can have strong positive sentiment. Atmosphere can have a negative sentiment due to the lower 2 of 5 star rating. Speed can have a neutral sentiment with a 3 of 5 star rating. These attributes and sentiments can be stored for later combination with attributes from other content.

General attributes (e.g., attributes from the category information) and specific attributes (e.g., attributes discovered upon content analysis) can be rated and reported to a business representative. In the embodiment shown, a combined rating of food can be a 10 due to the strong positive sentiment toward the food from the analyzed content 1004, 1006 and 1008. Atmosphere rating 1018 can be a 2 due to the more negative sentiment toward the atmosphere in attributes 1010, 1012 and 1014. Service rating 1020 can be an 8 based on the good positive sentiment associated with romantic. Price rating 1022 may not be rated because a lack of information that only includes the sentiment of "trendy." Crave rating 1024 can be a 7 due to the strong positive sentiment in one review. Speed rating 1026 can be rated a 5 due to the neutral rating of the attribute in one review.

Figure 12:
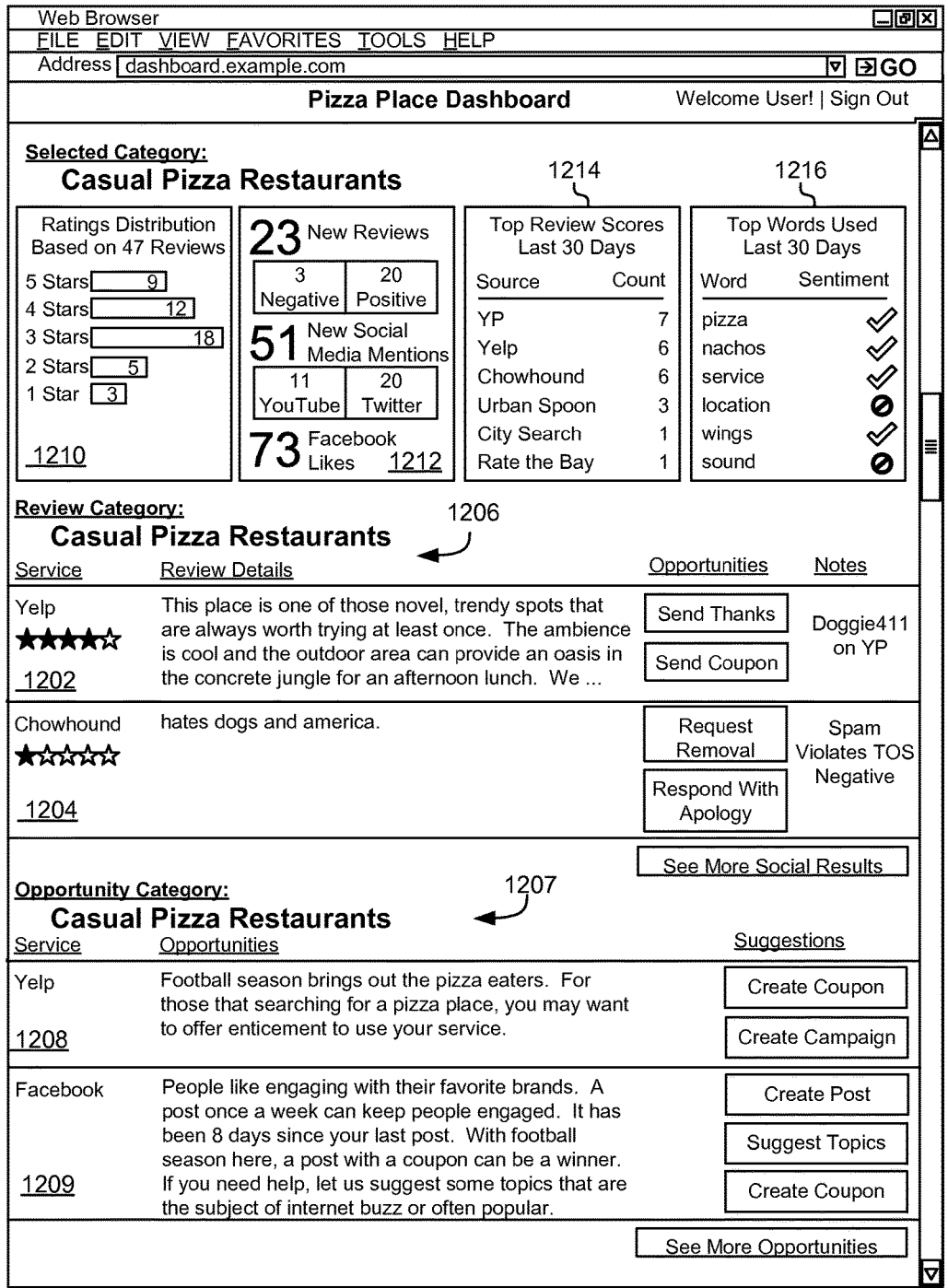
FIG. 12 illustrates an embodiment of a user interface of a management system configured for attribute rating and opportunity management.
Figure 13:
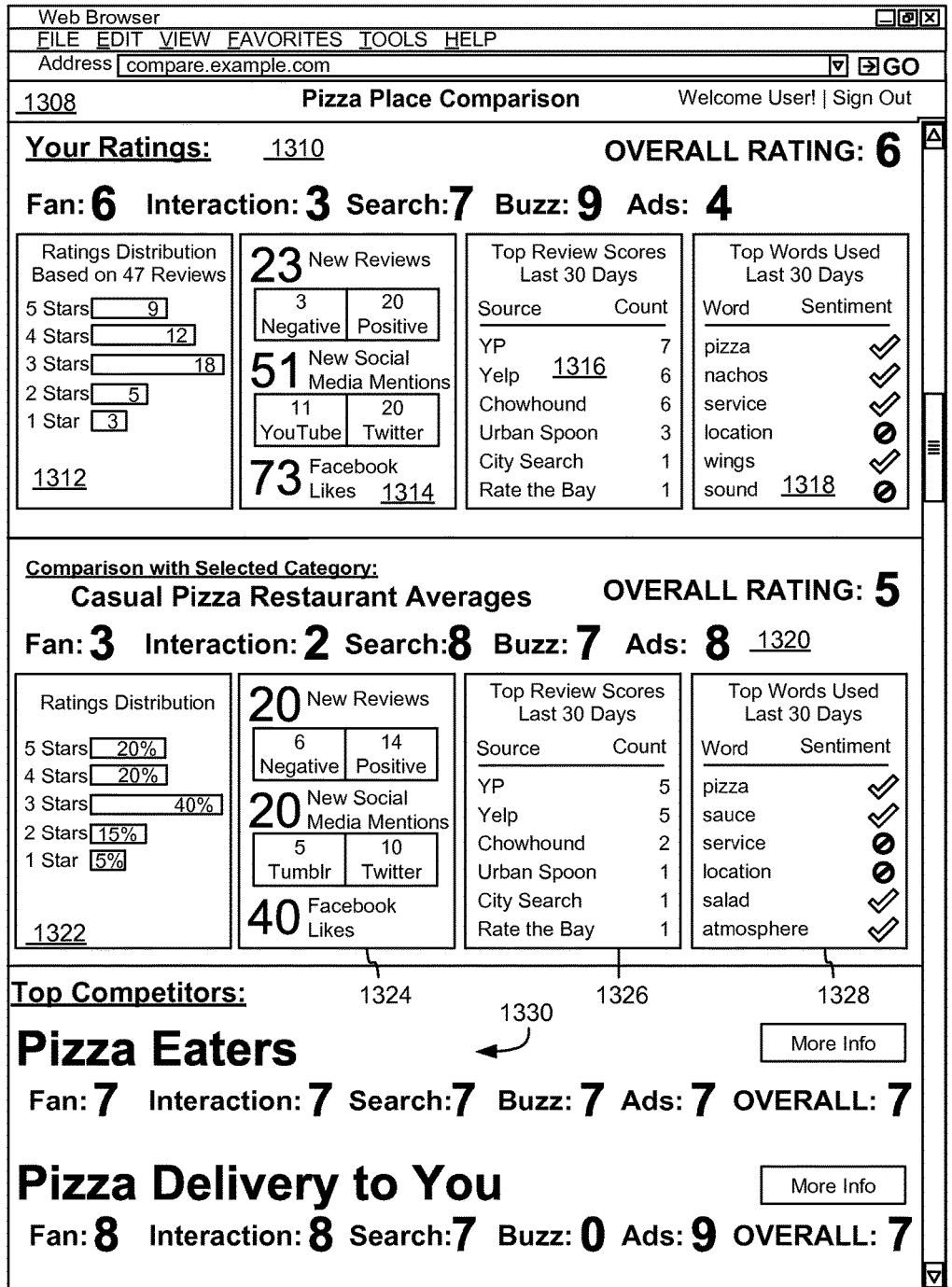
FIG. 13 illustrates a user interface of a management system configured for online business evaluation and comparison.

FIGS. 11 to 13 show examples of user interfaces to a management system. FIG. 11 shows a publisher recommendation and monitoring dashboard, in accordance with certain embodiments of the present disclosure. FIG. 12 shows a review management dashboard with suggested responses. FIG. 13 shows an area of emphasis competitive analysis report.

FIG. 11 illustrates a user interface 1100 of an embodiment of the management system for publisher recommendation, in accordance with certain embodiments of the present disclosure. A business representative can cause a web browser 1102 to access a web site (e.g., web application) that includes a dashboard for publisher recommendation. The business representative can provide unique company information 1114 to the web application (e.g., profile information). In some embodiments, a management system (such as management system 202 from FIG. 2) can determine category 1118 from unique company information 1114. Based on category 1118, publishers 1112 can be recommended for publication. Publishers might be missing information or require correction of published information. In the embodiment shown, a business representative can click on a button to accept the recommendations to publish to publishers 1112. Based on the publishers 1112 selected, a superset of content 1120 can be requested from the business representative.

Management system can continue to monitor selected publishers for problems. Publisher listings 1104, 1106, 1108 and 1110 can identify the publisher, published details, descriptions, errors and invitations to fix any problems. For example, Urban Spoon™ listing 1110 can show the published details and description, with a list of errors. In the embodiment shown, a fix request is in progress and no further invitations are available. Play in the Bay listing 1108 can show the published details and description with a list of errors. Listing 1108 can also include invitations to fix the errors or mark the errors as acceptable. Facebook™ listing 1106 can indicate that no listing is present and can recommend publishing by clicking a "fix" button. SF News listing 1104 can indicate listing details and description. Listing 1104 can also indicate the published information is correct and include an invitation to view the listing by clicking a "view listing" button.

When a business representative accepts an invitation through the dashboard, the management system can implement it. In an embodiment, the management system can communicate with a publisher to cause a correction or publication to be achieved. The management system can communicate with the publisher through an API to cause publication. If the publisher does not have an API, the management system can imitate a user and perform form submission. In some embodiments, a preview is generated for approval.

FIG. 12 illustrates an embodiment of a user interface of a management system configured for attribute rating and opportunity management, in accordance with certain embodiments of the present disclosure. A business representative can cause a web browser 1230 to access a dashboard 1200 providing information about attribute rating and opportunity management. A management system (e.g., management system 302 from FIG. 3 or management system 402 from FIG. 4) can analyze publisher content to determine consumer sentiment and opportunities to respond. Summary information can include rating distributions 1210, social media mentions 1212, best scores 1214 and words 1216 describing the business.

Review response section 1206 can provide options for responses to positive or negative reviews. A business representative can review positive review summary 1202 and select a potential option for responding to the positive review. In the embodiment shown, two options are presented by the management system based on the positive review and business category. A send thanks option can cause the management system to compose a response based on the review content. The response can be presented to a business representative for editing or can be directly published without editing. A business representative can also review negative review summary 1204 and select a proposed response. In the embodiment shown, two options are presented by the management system based on the negative review. A request removal option can cause the management system to contact the publisher and request removal for reasons including the ones shown in the notes column. An apology response can cause the management system to contact the publisher and post an apology to associate with the negative review. The apology can be composed by the management system based on the negative review and/or business category.

Opportunity section 1207 can provide options for engaging with customers who are identified by management system based on publishers (and, in some embodiments, a business category). The management system can determine suggested opportunities based on timing (e.g., purchases habits, holidays, etc.), media mentions, social interaction, etc. Individual opportunity listing 1208 can include options to reward an individual that contributes to business content. The management system can select options based on the individual contribution (and in some embodiments, business category). In the embodiment shown, the management system has determined that an appropriate response would be to give the reviewer a coupon. A second suggestion is to further engage the reviewer with a campaign, such as by inviting the reviewer to share a coupon to determine an advertising reach of the reviewer. Tracking can be used on the opportunities to determine successful engagement. Engagement success can be used to influence future recommendations in the category or otherwise.

A persona matching engine can aid in the determination of important customers that influence and/or publish content. For example, a persona matching engine can determine that reviews from multiple publishers originate from a same persona. By determining the persona, the management system can determine the influence of the persona. The persona can be given greater rewards than would have been offered to a single account. The persona matching engine can also help minimize the effect of a frequent negative reviewer by helping publishers identify spam from a same source.

Group opportunity listing 1209 can include options to engage with customers through a publisher. In the embodiment shown, the management system has determined that a new social media post would provide needed customer engagement. The management system has determined, based on the business category and publisher, that three options can be useful. A first option can be to allow a business representative to create a new post. A second option can be to allow the management system to suggest a topic and/or even provide content for the post. A third option can be to create a coupon to share through the publisher. Tracking can be used on the opportunities to determine successful engagement. Engagement success can be used to influence future recommendations in the category or otherwise. A business representative can select one or more of the options. The management system can then contact the publisher and implement the selection.

FIG. 13 illustrates a user interface of a management system configured for online business evaluation and comparison, in accordance with certain embodiments of the present disclosure. A business representative can cause a web browser 1300 to access a dashboard 1332 providing information about areas of emphasis and ratings. A management system (e.g., management system 402 from FIG. 4 or management system 502 from FIG. 5) can analyze publisher content to determine consumer sentiment and rate areas of emphasis. Summary information can include rating distributions 1312, social media mentions 1314, best scores 1316 and words 1318 with sentiment describing the business.

The management system can rate published business information according to areas of emphasis. The management system can retrieve and analyze publisher content (including the content itself and metadata about the content) to determine ratings of areas of emphasis as described in conjunction with FIG. 9. Business ratings 1310 can be displayed as part of the dashboard. Ratings can include areas of emphasis that are selected by the management system based on a business category associated with the business, in some embodiments. For the embodiment shown, a casual pizza restaurant business can include areas of emphasis of a fan rating, interaction rating, search rating, buzz rating, ads rating and an overall rating (see a description of FIG. 9 for more information on ratings). Information behind the ratings can be provided as part of the dashboard, including rating distributions 1312, social media mentions 1314, best scores 1316 and words 1318 with sentiment describing the business.

In various embodiments, the management system can provide a comparison of the areas of emphasis with a category average 1320 and/or competitors 1330. The management system can retrieve and analyze publisher content (including the content itself and metadata about the content) about businesses to determine ratings of areas of emphasis as described in conjunction with FIG. 9. Business category ratings 1320 can be shown for comparison to business ratings 1310. Differences in ratings can highlight weaknesses and/or strengths among the areas of emphasis selected. Information behind the category ratings can be given, including category rating distributions 1322, category social media mentions 1324, average best category scores 1326, and/or words 1328 with sentiment describing businesses within category. Top competitor scores 1330 can also be given to enable further comparisons between the business and competitors. In some embodiments, clicking on a statistic can cause an informational screen that explains the statistic and the content behind the statistic.

The management system can analyze publisher content to determine business attributes and customer sentiment regarding the attributes. The management system can retrieve and analyze publisher content (including the content itself and metadata about the content) about businesses to determine business attributes and customer sentiment about the attributes as described in conjunction with FIG. 10. In the embodiment shown, attributes and sentiment are shown in the words 1318 with sentiment describing the business. Customers have a positive view of pizza, nachos, service and wings. Customers have a negative perception of location and sound. In comparison, the casual pizza restaurant customers in general have a positive sentiment toward pizza, sauce, salad and atmosphere. The casual pizza restaurant customers in general have a negative sentiment toward service and location.

Figure 14:
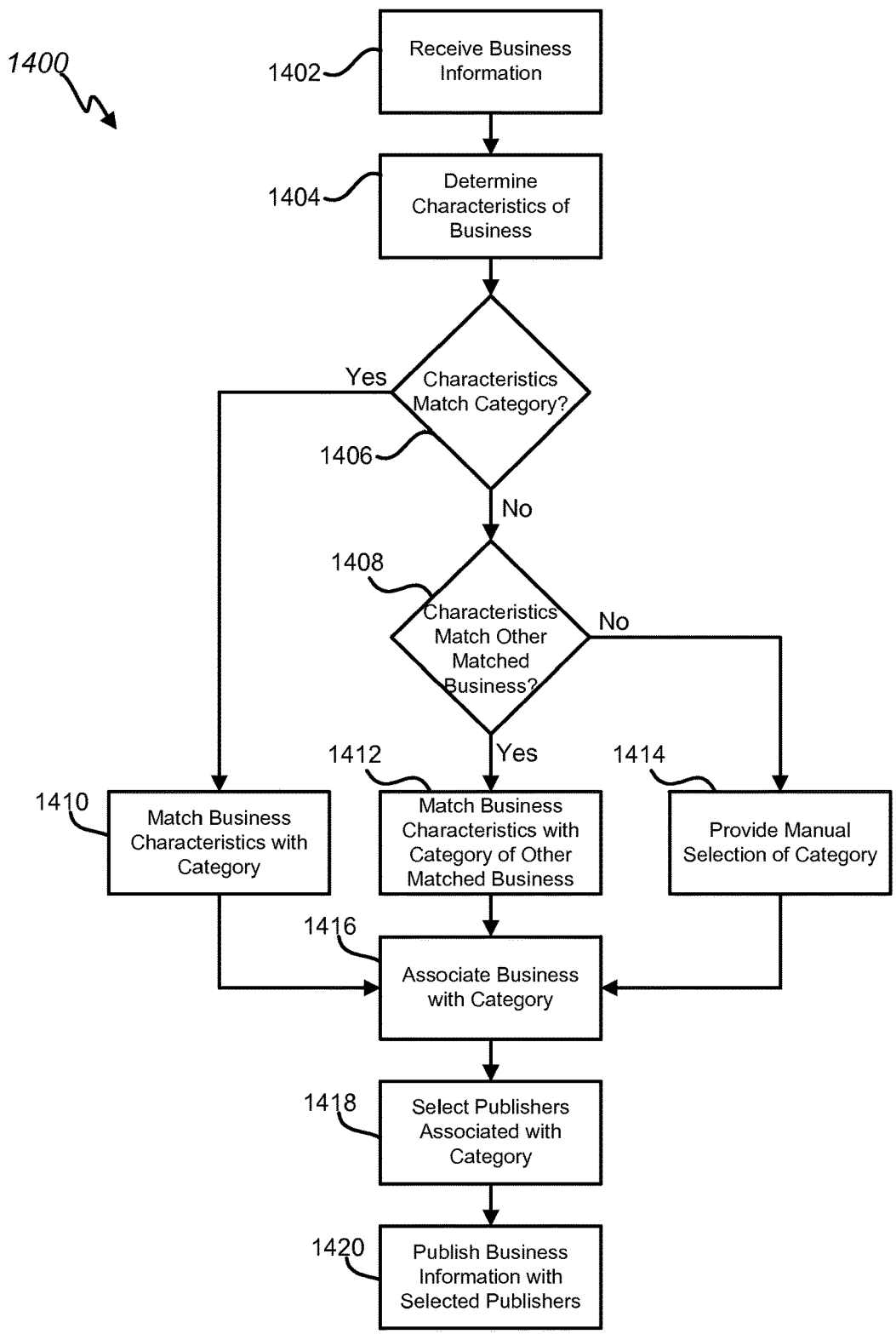
FIG. 14 illustrates a flowchart of an embodiment of business to publisher matching.
Figure 15:
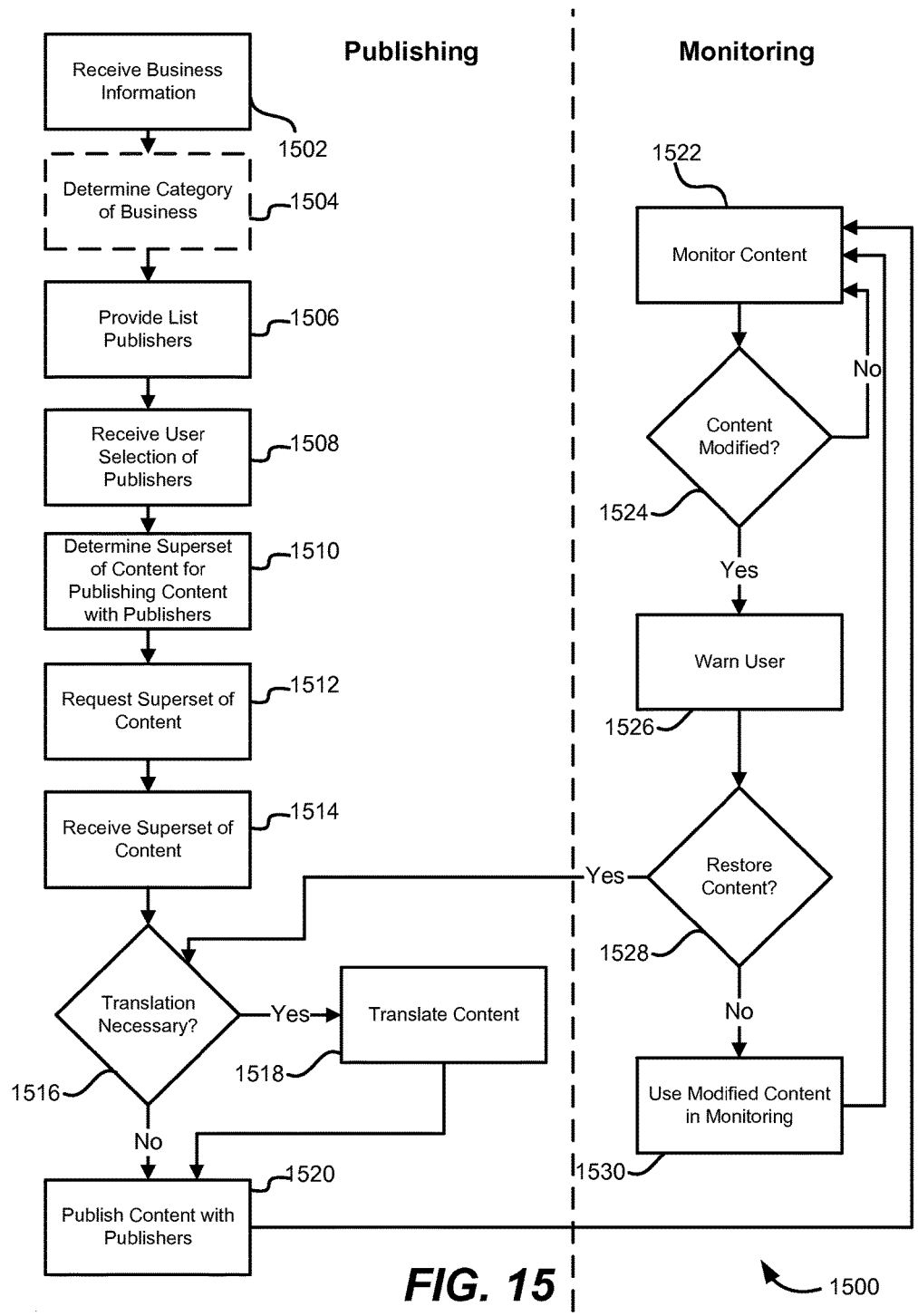
FIG. 15 illustrates a flowchart of an embodiment of business to publisher matching, monitoring and correction.
Figure 16:
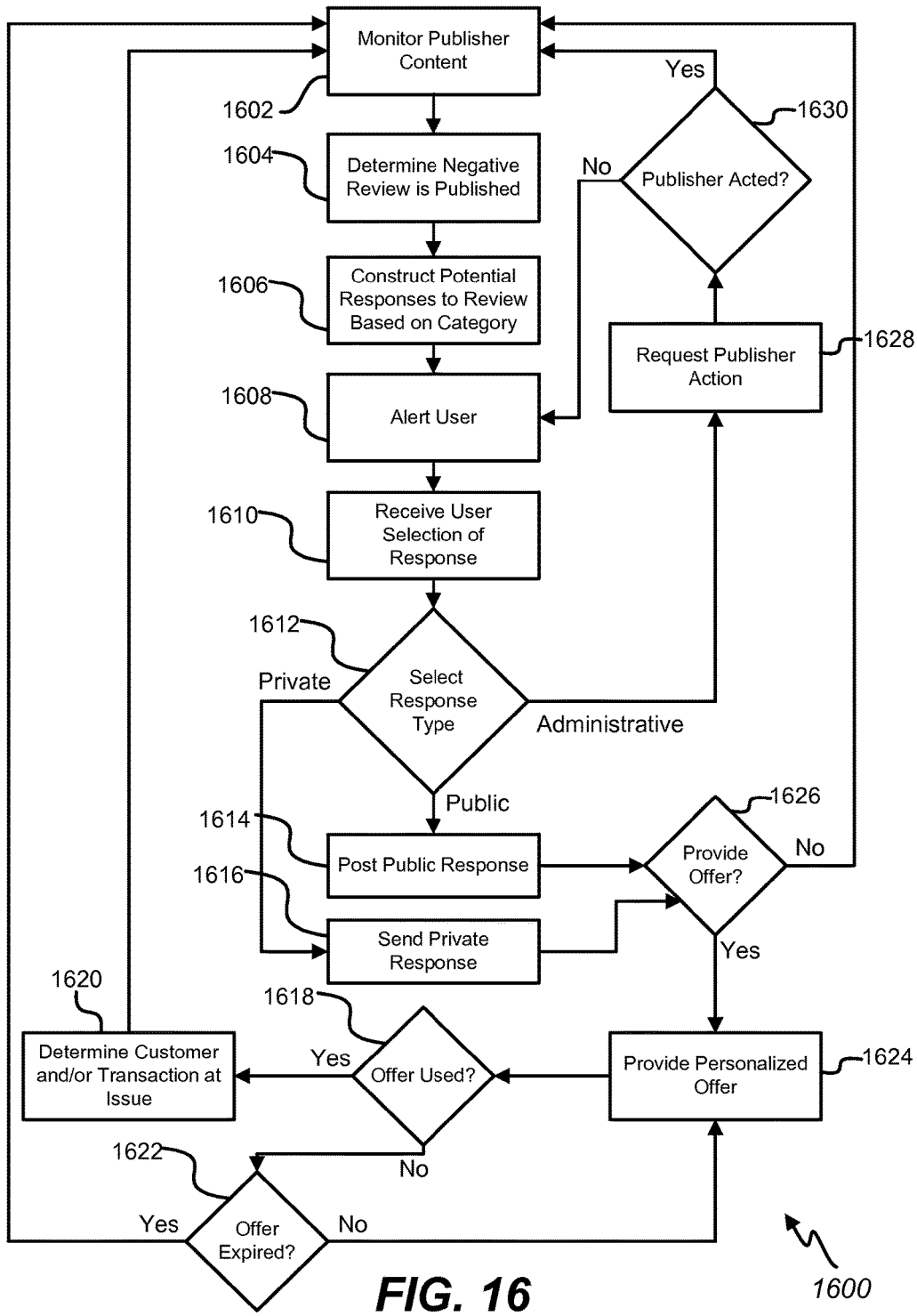
FIG. 16 illustrates a flowchart of an embodiment of response recommendations to publisher content.
Figure 17:
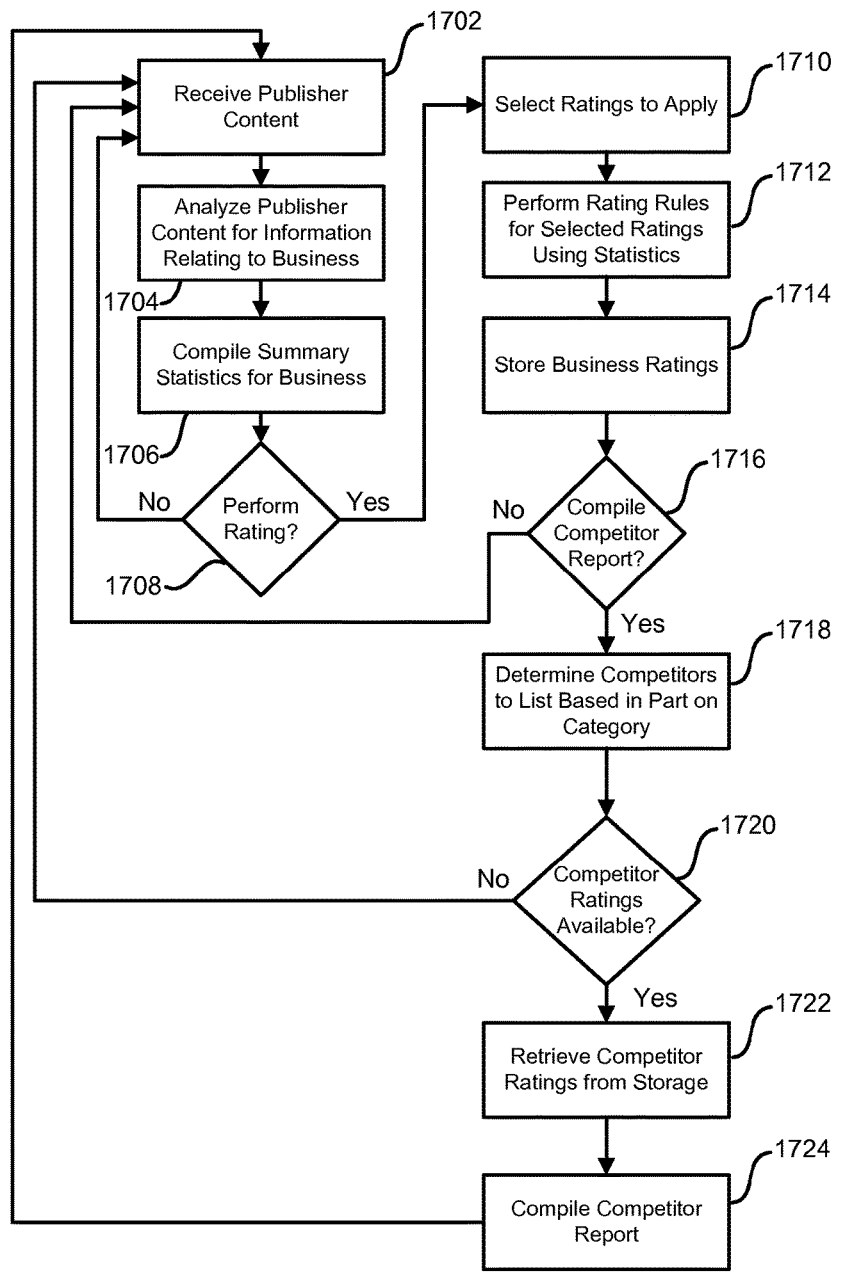
FIG. 17 illustrates a flowchart of an embodiment of a process for online business evaluation.
Figure 18:
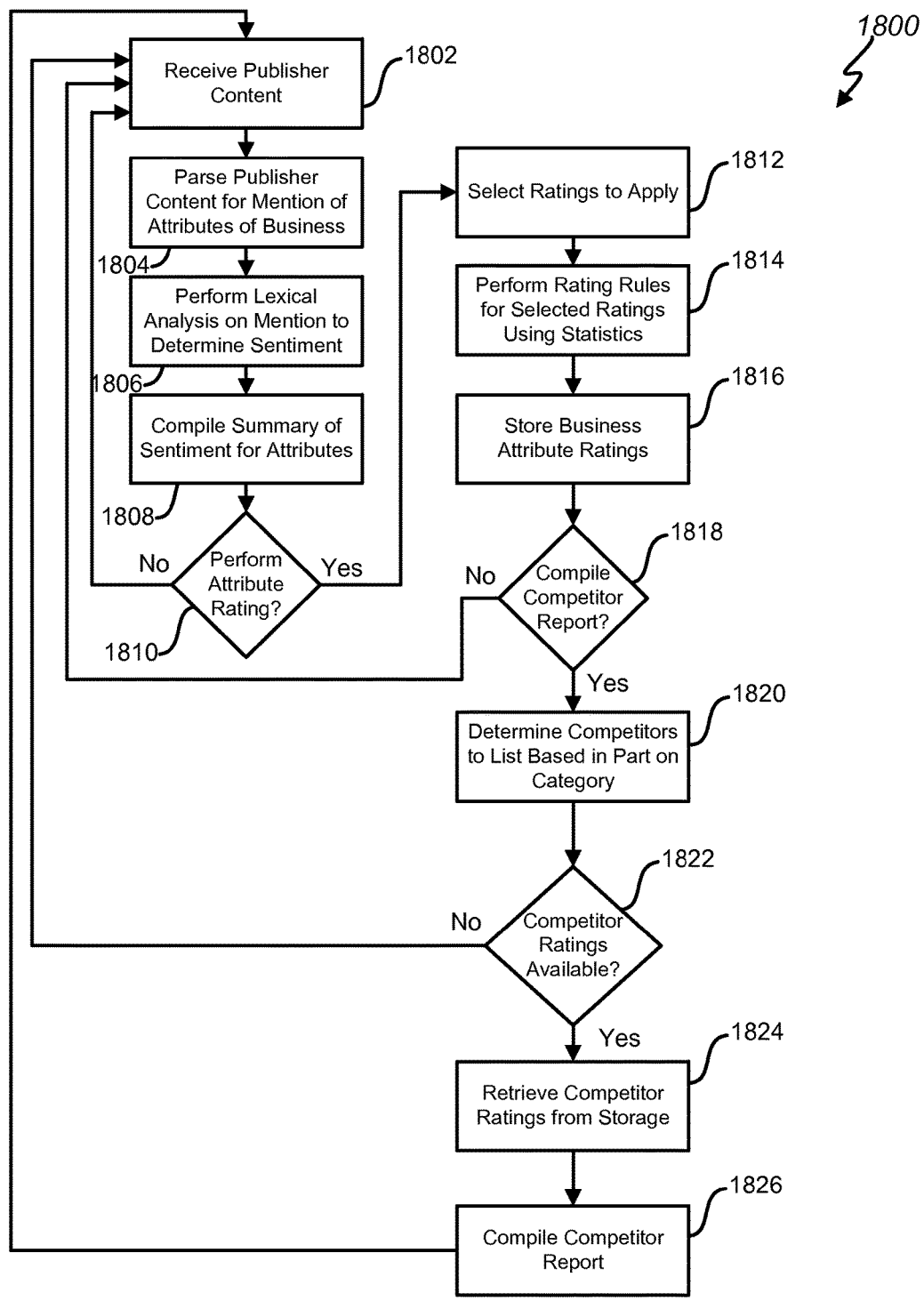
FIG. 18 illustrates a flowchart of an embodiment of a process for business attribute determination.
Figure 19:
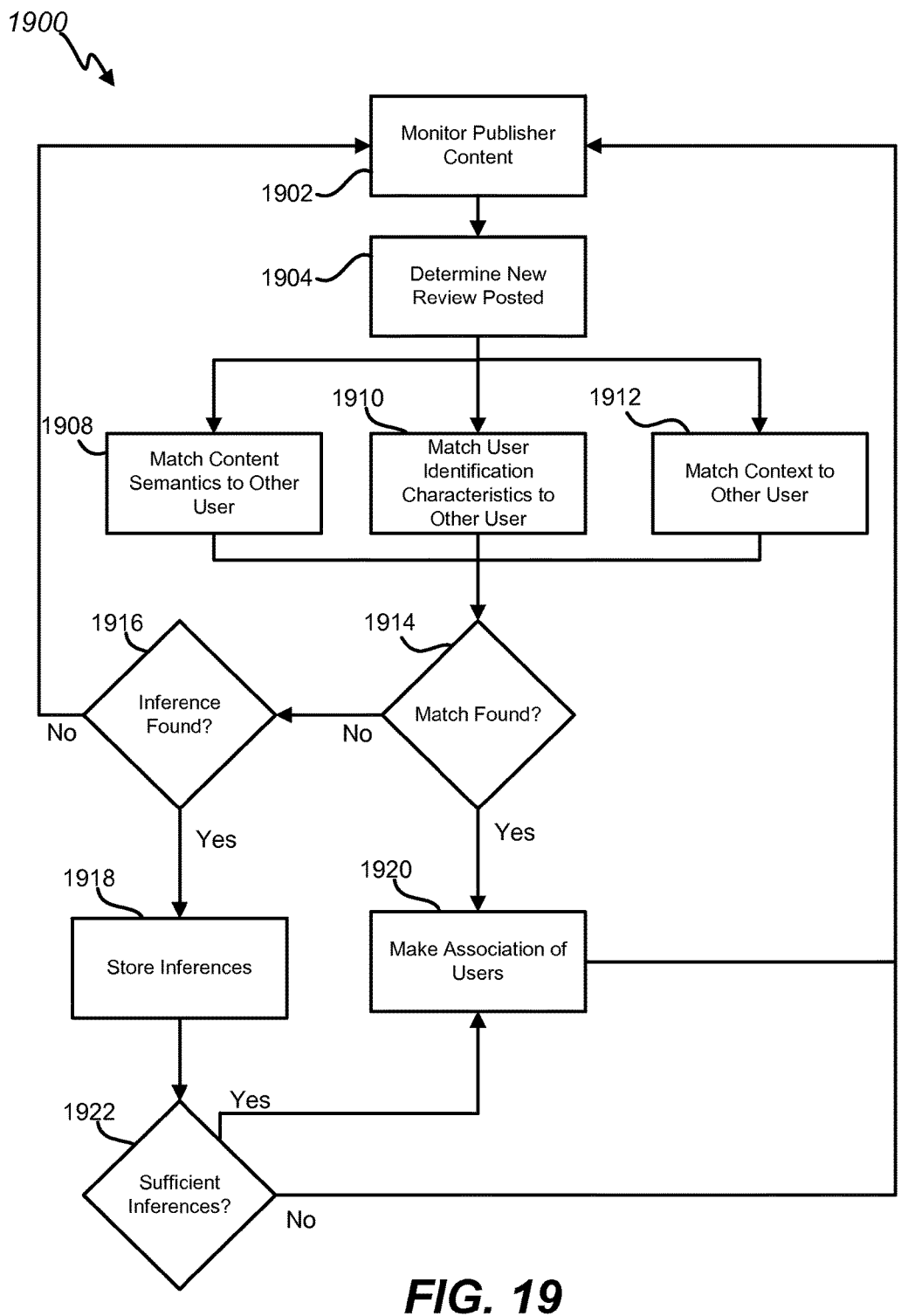
FIG. 19 illustrates a flowchart of an embodiment of a process for multiple user persona matching.

FIGS. 14 to 19 show examples of processes executable by a publisher management system (e.g., management systems 202, 302, 402 and 502 from FIGS. 2-5), in accordance with certain embodiments of the present disclosure. FIG. 14 shows a process for matching publishers to a business. FIG. 15 shows a process of selecting publishers, publishing content to the publishers, and monitoring content provided by the publishers. FIG. 16 shows a process for responding to content published by a publisher. FIG. 17 shows a process for rating a business on aspects (e.g., areas of emphasis) of the business. FIG. 18 shows a process for determining attributes and sentiment about the attributes of a business. FIG. 19 shows a process for determining whether multiple accounts providing content to a publisher share a common persona (e.g., a same user).

FIG. 14 illustrates a flowchart of a process 1400 of business to publisher matching using categories, in accordance with certain embodiments of the present disclosure. The process can be implemented by a management system 202, clients 204-1 to 204-n and publishers 262-1 to 262-n as seen in FIG. 2. In box 1402, a management system receives business information from a client. In box 1404, the management system determines characteristics of the business (e.g., products or services provided by the business, customers served, market, location, etc.). In box 1406, the management system then determines if the characteristics match characteristics associated with a business category. If so, in block 1410, the management system can successfully match the business characteristics to business category characteristics. In block 1416, the management system can automatically associate the business with the category.

If, in block 1406, the business characteristics do not match a business category, the business characteristics can be compared with other businesses in block 1408. If the business characteristics match with a second business exceeds a threshold, the business can be determined to match with the category of the second business in block 1412. In block 1416, the business can then be associated with the category of the second business.

If, in block 1408, the business characteristics do not match other business characteristics, a business representative can provide a manual selection of a category in block 1414. The business can then be associated with the category in block 1416.

After associating the business with a category in block 1416, the management system can select publishers associated with the category in block 1418. The publishers can be proposed to business representative for approval. In block 1420, the management system can publish business information with the selected publishers.

FIG. 15 illustrates a flowchart of a process of business to publisher matching, monitoring and correction, in accordance with certain embodiments of the present disclosure. The process can be implemented by a management system 202, clients 204-1 to 204-n and publishers 262-1 to 262-n as seen in FIG. 2. The process can begin similar to the process described in relation to FIG. 14. In block 1502, a business representative can provide business information for receipt by a management system. In block 1504, in some embodiments the management system can determine a category of business to associate with the business. In block 1506, the management system can provide a list of publishers to the business representative. In some embodiments, the list of publishers may be based on the associated category. In block 1508, management system can receive the business representative selection of publishers. In block 1510, a superset of content to satisfy the selected set of publishers can be determined. In some embodiments, the superset of content can be received in multiple different formats (e.g., sizes, file types, content types, etc.) and converted to publisher requirements. In block 1512, the superset of content can be requested from the business representative. In block 1514, the superset (or a portion thereof) can be received by the management system. If any of the content from the superset of content needs translation in block 1516, the content can be translated in block 1518 to a publisher specified format. In block 1520, the management system can send content to publishers and cause the publishers to publish the content.

In block 1522, the management system can then monitor publishers' content for changes. In block 1524, the management system can detect content changes to publisher content. If a change is detected in block 1524, then the management system can warn the business representative in block 1526. In block 1528, if a business representative chooses to restore content, the process returns to block 1516 to translate in block 1518 and republish content with the publisher in block 1520. If the content is not to be restored in block 1528, the modified content can be selected to be used in future monitoring in block 1530.

FIG. 16 illustrates a flowchart of a process 1600 of suggesting response recommendations to publisher content, in accordance with certain embodiments of the present disclosure. The process can be implemented by a management system 302, clients 304-1 to 304-n and publishers 362-1 to 362-n as seen in FIG. 3. In block 1602, the management system can monitor publishers for new content. In block 1604, the management system can discover a negative review has been published by a publisher. In block 1606, the management system can construct potential responses to the negative review as described in conjunction with FIG. 7. In block 1608, a business representative (e.g., user) can be alerted to the negative review. In block 1610, the management system can receive one or more selections of potential responses to implement. In block 1612, the management system can implement three types of responses (although it should be recognized that more response types can be possible and that three are shown here for illustration).

If an administrative response type is possible and selected in block 1612, the management system can request publisher action in block 1628 (e.g., removal, deletion, deactivation, etc.). If the management system detects the publisher performs the action in block 1630, the management system can go back to monitoring publisher content in block 1602. If the management system does not detect publisher action in block 1630, the management system can go back and alert the user to publisher inaction in block 1608 and provide alternative potential responses. Publisher action can be requested in publisher defined situations. For example, a publisher may allow requests for removal for spam, terms of service violations, harassment, copyright infringement, competitor reviews, etc. However, the publisher may or may not honor such requests.

If a personal response type is possible in 1612, a public response in block 1614 or private response in block 1616 can be used. In block 1614, a public response can be posted along with the review. Such a post can include an apology and/or an invitation as described in conjunction with FIG. 7. In block 1616, a private response can be sent directly to the reviewer. Such a response can include an apology and/or an invitation as described in conjunction with FIG. 7. If no offer is provided in block 1626, the management system can return to monitoring publisher content in block 1602. If an offer is provided in block 1626, a personalized offer can be provided with tracking information in block 1624. If the offer gets used in block 1618, the customer behind the review and/or the transaction can be identified in block 1620 and the management system can return to monitoring content in block 1602. If the offer is not used in block 1618 and the offer is not expired in block 1622, a reminder of the personalized offer can be resent in block 1624. If the offer has expired in block 1622, then the management system can return to monitoring content in block 1602.

FIG. 17 illustrates a flowchart of an embodiment of a process for online business evaluation, in accordance with certain embodiments of the present disclsoure. The process can be implemented by a management system 402, clients 404-1 to 404-n and publishers 462-1 to 462-n as seen in FIG. 4. In block 1702, the management system can receive publisher content. The management system can receive the content from visiting publisher sites, receiving API calls from publishers about new content or receiving content (or pre-digested content) from other systems (e.g., third party systems, content scraping systems, distributed systems, customer add-ins, etc.). In block 1704, the management system can analyze the publisher content for information relating to a business. It should be recognized that in some embodiments, multiple businesses can be processed in parallel. In block 1706, a set of summary statistics can be compiled relating to the business. In some embodiments, the set of summary statistics may be compiled based at least in part on the category of the business. In block 1708, a business rating can be selected to be performed. The rating can be performed at selected intervals, or if sufficient data has changed among other reasons. If the rating is not selected for performance in block 1708, then more publisher content can be received in block 1702.

If a rating is selected to be performed in block 1708, then areas of emphasis can be selected for ratings in block 1710. In some embodiments, the areas of emphasis can be selected for ratings based at least in part on a category associated with the business. Rating rules (e.g., formulas for computing the ratings, thresholds for the ratings, etc.) can be retrieved for the areas of emphasis and executed in block 1712, using the determined statistics from block 1706. In some embodiments, the rating rules may be category-specific. The ratings can then be stored for later retrieval in block 1714. If a competitor report is not to be compiled in block 1716, more publisher content can be retrieved in block 1702. If a competitor report is selected to be compiled in block 1716, a list of competitors can be selected in block 1718. In some embodiments, the list of competitors may be based at least in part on the business category. If the competitor ratings are not available in block 1720, each selected competitor can be processed through blocks 1702 to 1714. Once competitor ratings are available in block 1720, competitor ratings can be retrieved from storage in block 1722. A competitor report showing ratings from any one or combination of competitors, category averages, and/or the business can be compiled and sent to a business representative in block 1724.

FIG. 18 illustrates a flowchart of an embodiment of a process for business attribute determination, in accordance with certain embodiments of the present disclosure. The process can be implemented by a management system 502, clients 504-1 to 504-n and publishers 562-1 to 562-n as seen in FIG. 5. In block 1802, the management system can receive publisher content (including using content in tandem with process 1700 from FIG. 17). In block 1804, the management system can analyze the publisher content for attributes relating to a business. It should be recognized that in some embodiments, multiple businesses can be processed in parallel. In block 1806, an analysis (e.g., lexical analysis, sentiment analysis, etc.) can be performed on the content based on the attributes to determine a sentiment related to the attributes. The management system can discover specific attributes. In some embodiments, the management system may also apply information about specific attributes to generic attributes applicable to the category. For example, an attribute of sauce can be discovered, but the sentiment for the attribute of sauce can also be applied to a generic attribute of food. In block 1808, a summary of sentiment for the attributes (generic and/or specific) can be stored. In some embodiments, the information can be stored along with sentiment for generic attributes associated with the category. In block 1810, attribute ratings can be selected for performance. The rating can be performed, for example, at selected intervals, or if sufficient data has changed. If the rating is not selected for performance in block 1810, then more publisher content can be received in block 1802.

If attribute ratings are selected to be performed in block 1810, then attributes can be selected for ratings in block 1812. In some embodiments, the attributes may be generic attributes selected for ratings based at least in part on a category associated with the business. Rating rules (e.g., formulas for computing the ratings, thresholds for the ratings, etc.) can be retrieved for the attributes and executed in block 1814 using the determined sentiment from block 1808. In some embodiments, the rating rules may be category-specific. The ratings can then be stored for later retrieval in block 1816. If a competitor report is not to be compiled in block 1818, more publisher content can be retrieved in block 1802. If a competitor report is selected to be compiled in block 1818, a list of competitors (which may be in the business category, in some embodiments) can be selected in block 1820. If the competitor ratings are not available in block 1822, each selected competitor can be processed through blocks 1802 to 1816. Once competitor ratings are available in block 1822, competitor ratings can be retrieved from storage in block 1824. A competitor report showing attributes and/or ratings from any one or combination of competitors, category averages, and/or the business can be compiled and sent to a business representative in block 1826.

FIG. 19 illustrates a flowchart of an embodiment of a process 1900 for multiple user persona matching, in accordance with certain embodiments of the present disclosure. The process can be implemented by a management system 302, clients 304-1 to 304-n, persona matching system 364 and publishers 362-1 to 362-n as seen in FIG. 3. While this embodiment focuses on a review, it should be recognized that the principles can also be applied to content. In block 1902, the management system can monitor publisher content (including using content in tandem with process 1700 from FIGS. 17 and 18). In block 1904, the management system can determine that new review is posted. Management can then analyze the review through multiple content analyses that can be performed in parallel. In the embodiment shown, three analyses are performed in parallel to attempt to determine that a common persona is indicated by a match between publisher content from a first account with publisher content from a second account. In block 1908, a semantic analysis can be performed on the review. The semantic analysis can be matched against prior semantic analyses performed on other publisher content. Results of analyses can be stored in a datastore for future comparisons as well.

In block 1910, user identification characteristics can be matched against other user identification characteristics of past reviews. For example, user characteristics can include account information (account name, avatar, bio, description, etc.), internet information (IP address, IP address block, browser information, etc.), personally identifying information (e.g., address, name, phone number, etc.) and/or tracking information (e.g., cookies, session information, etc.). Matches can be full or partial matches and weighted according to the depth of the match (e.g., a full or partial match).

In block 1912, the management system can match a context of a review to context of a past review or set of past reviews. Measurements of context can detect artificial diversity between reviews. For example, if a set of reviews is improbable because a set of reviews is foreign IP addresses, the reviews do not duplicate attributes and include very negative content, then the reviews can be part of a negative campaign by a competitor. Context can include timeframes, intersections of review content (e.g., attributes that the content covers), intersections of Internet information and other measurements of diversity.

If a match is found in block 1914, then the accounts can be determined to share a persona. An association between the users and/or accounts can be formed in block 1920 and the management system can then return to monitoring publisher content in block 1902

If a match is not found in block 1914, the management system can test for an inference that accounts share a persona in block 1916. If no inference is found, then the management system can return to block 1902. If an inference is found in block 1916, the inference can be stored in block 1918. Inferences can be reported to the publishers, business representatives and/or remain in the system. In some embodiments, the inferences can be used to flag accounts that appear similar, but need more evidence for confirmation. If a match is determined in block 1914, an association between the users and/or accounts can be formed in block 1920 and the management system can then return to monitoring publisher content in block 1902.

Figure 20:
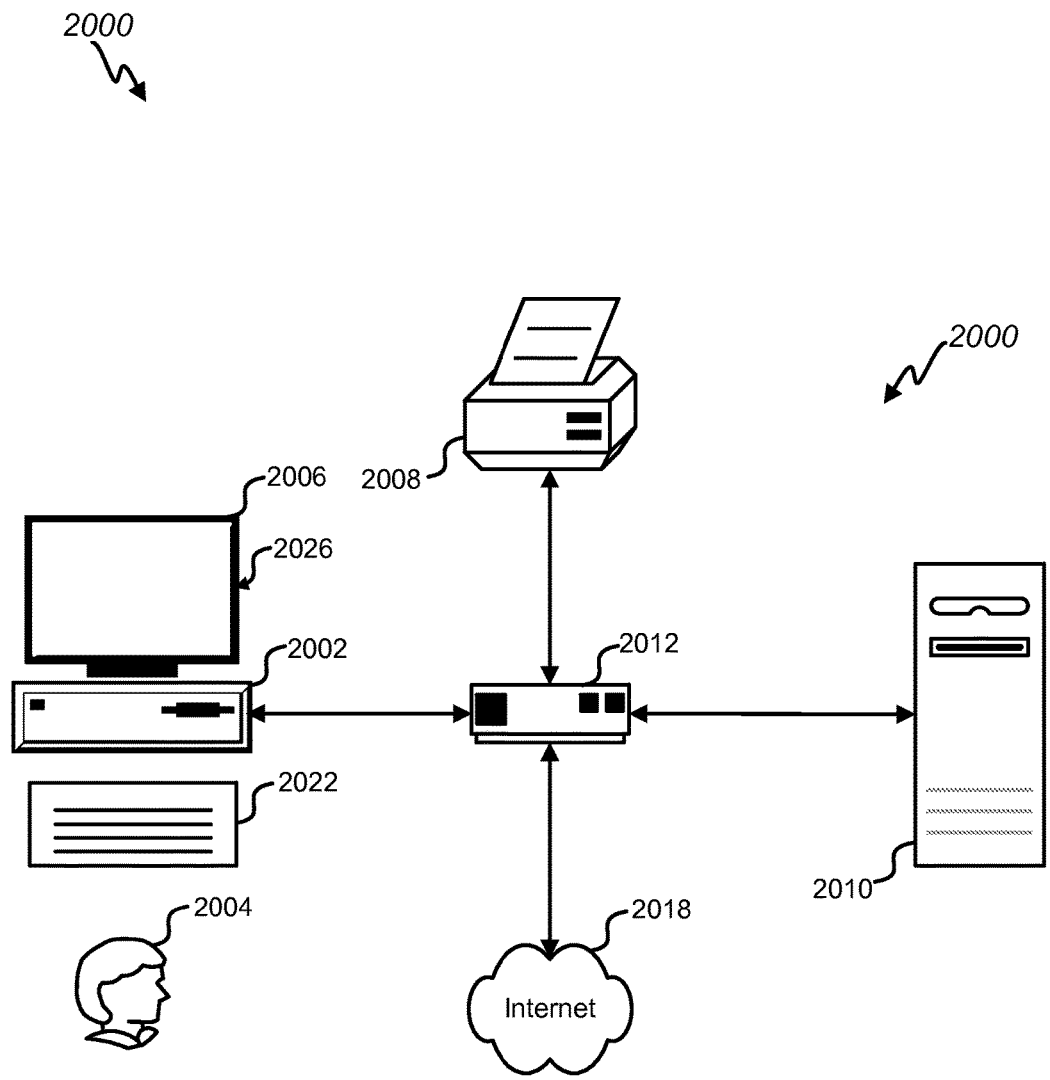
FIG. 20 depicts a block diagram of an embodiment of a computer system, in accordance with certain embodiments of the present invention.

Referring next to FIG. 20, an exemplary environment with which embodiments may be implemented is shown with a computer system 2000 that can be used by a designer 2004 to design, for example, without limitation, electronic designs. The computer system 2000 can include a computer 2002, keyboard 2022, a network router 2012, a printer 2008, and a monitor 2006. The monitor 2006, processor 2002 and keyboard 2022 are part of a computer system 2026, which can be a laptop computer, desktop computer, handheld computer, mainframe computer, etc. The monitor 2006 can be a CRT, flat screen, etc.

A designer 2004 can input commands into the computer 2002 using various input devices, such as a mouse, keyboard 2022, track ball, touch screen, etc. If the computer system 2000 comprises a mainframe, a designer 2004 can access the computer 2002 using, for example, without limitation, a terminal or terminal interface. Additionally, the computer system 2026 may be connected to a printer 2008 and a server 2010 using a network router 2012, which may connect to the Internet 2018 or a WAN.

The server 2010 may, for example without limitation, be used to store additional software programs and data. In some embodiments, software implementing the systems and methods described herein can be stored on a storage medium in the server 2010. Thus, the software can be run from the storage medium in the server 2010. In another embodiment, software implementing the systems and methods described herein can be stored on a storage medium in the computer 2002. Thus, the software can be run from the storage medium in the computer system 2026. Therefore, in this embodiment, the software can be used whether or not computer 2002 is connected to network router 2012. Printer 2008 may be connected directly to computer 2002, in which case, the computer system 2026 can print whether or not it is connected to network router 2012.

Figure 21:
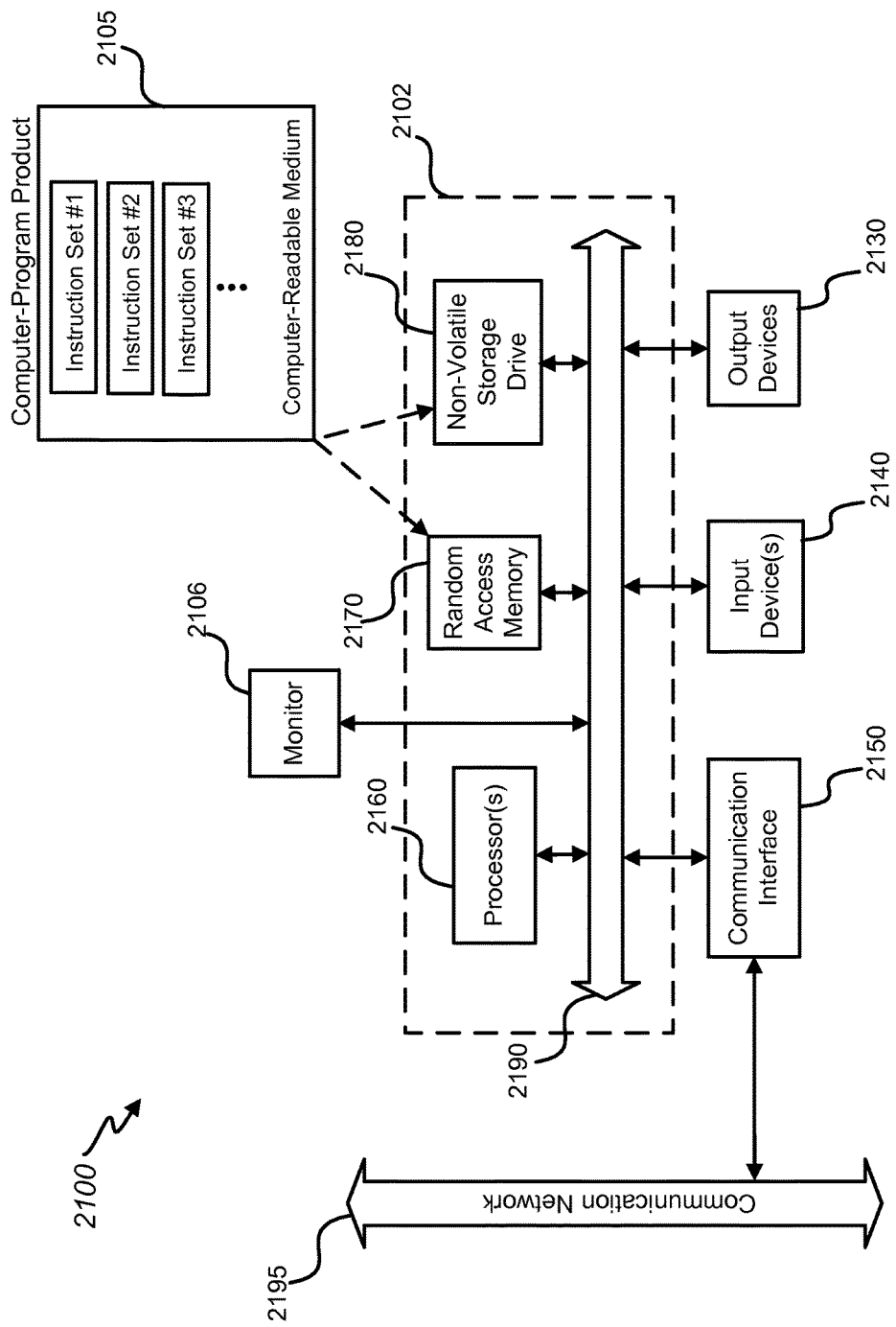
FIG. 21 depicts a block diagram of an embodiment of a special-purpose computer system, in accordance with certain embodiments of the present disclosure.

With reference to FIG. 21, an embodiment of a special-purpose computer system 2100 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 426, it is transformed into the special-purpose computer system 2100.

Special-purpose computer system 2100 comprises a computer 2102, a monitor 2106 coupled to computer 2102, one or more additional user output devices 2130 (optional) coupled to computer 2102, one or more user input devices 2140 (e.g., keyboard, mouse, track ball, touch screen) coupled to computer 2102, an optional communications interface 2150 coupled to computer 2102, a computer-program product 2105 stored in a tangible computer-readable memory in computer 2102. Computer-program product 2105 directs system 2100 to perform the above-described methods. Computer 2102 may include one or more processors 2160 that communicate with a number of peripheral devices via a bus subsystem 2190. These peripheral devices may include user output device(s) 2130, user input device(s) 2140, communications interface 2150, and a storage subsystem, such as random access memory (RAM) 2170 and non-volatile storage drive 2180 (e.g., disk drive, optical drive, solid state drive), which are forms of tangible computer-readable memory.

Computer-program product 2105 may be stored in non-volatile storage drive 2180 or another computer-readable medium accessible to computer 2102 and loaded into memory 2170. Each processor 2160 may comprise a microprocessor, such as a microprocessor from Intel® or Advanced Micro Devices, Inc.®, or the like. To support computer-program product 2105, the computer 2102 runs an operating system that handles the communications of product 2105 with the above-noted components, as well as the communications between the above-noted components in support of the computer-program product 2105. Exemplary operating systems include Windows® or the like from Microsoft® Corporation, Solaris® from Oracle®, LINUX, UNIX, and the like.

User input devices 2140 include all possible types of devices and mechanisms to input information to computer system 2102. These may include a keyboard, a keypad, a mouse, a scanner, a digital drawing pad, a touch screen incorporated into the display, audio input devices such as voice recognition systems, microphones, and other types of input devices. In various embodiments, user input devices 2140 are typically embodied as a computer mouse, a trackball, a track pad, a joystick, wireless remote, a drawing tablet, a voice command system. User input devices 2140 typically allow a user to select objects, icons, text and the like that appear on the monitor 2106 via a command such as a click of a button or the like. User output devices 2130 include all possible types of devices and mechanisms to output information from computer 2102. These may include a display (e.g., monitor 2106), printers, non-visual displays such as audio output devices, etc.

Communications interface 2150 provides an interface to other communication networks 2195 and devices and may serve as an interface to receive data from and transmit data to other systems, WANs and/or the Internet. Embodiments of communications interface 2150 typically include an Ethernet card, a modem (telephone, satellite, cable, ISDN), a (asynchronous) digital subscriber line (DSL) unit, a FireWire® interface, a USB® interface, a wireless network adapter, and the like. For example without limitation, communications interface 2150 may be coupled to a computer network, to a FireWire® bus, or the like. In other embodiments, communications interface 2150 may be physically integrated on the motherboard of computer 2102, and/or may be a software program, or the like.

RAM 2170 and non-volatile storage drive 2180 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 2170 and non-volatile storage drive 2180 may be configured to store the basic programming and data constructs that provide the functionality of various embodiments of the present invention, as described above.

Software instruction sets that provide the functionality of the present invention may be stored in RAM 2170 and non-volatile storage drive 2180. These instruction sets or code may be executed by the processor(s) 2160. RAM 2170 and non-volatile storage drive 2180 may also provide a repository to store data and data structures used in accordance with the present invention. RAM 2170 and non-volatile storage drive 2180 may include a number of memories including a main random access memory (RAM) to store of instructions and data during program execution and a read-only memory (ROM) in which fixed instructions are stored. RAM 2170 and non-volatile storage drive 2180 may include a file storage subsystem providing persistent (non-volatile) storage of program and/or data files. RAM 2170 and non-volatile storage drive 2180 may also include removable storage systems, such as removable flash memory.

Bus subsystem 2190 provides a mechanism to allow the various components and subsystems of computer 2102 to communicate with each other as intended. Although bus subsystem 2190 is shown schematically as a single bus, alternative embodiments of the bus subsystem may utilize multiple busses or communication paths within the computer 2102.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method for centrally managing online interactions among publishers, the method comprising:
storing, by one or more processors, an association between a first category in a directory and a first set of publishers, the first category representing a classification of a set of businesses sharing one or more common attributes;
receiving, by the one or more processors, first content comprising information for unique identification of a business;
matching, by the one or more processors, the business to the first category in the directory based at least in part on the first content;
compiling, by the one or more processors, a superset of content based at least in part on the first set of publishers associated with the first category, the superset of content comprising types of content for publication by the first set of publishers associated with the first category;
requesting, by the one or more processors, second content for the business based at least in part on the superset of content;
receiving, by the one or more processors, the second content;
storing, by the one or more processors, the second content received for the business in a content repository; and
transmitting, by the one or more processors, the second content to at least a subset of publishers from the first set of publishers for publication by the first set of publishers.

2. The method of claim 1, further comprising:
translating the second content stored by the content repository to meet requirements of a publisher from the first set of publishers.

3. The method of claim 2 further comprising:
ranking the first set of publishers based at least in part on an importance rating; and
receiving customer input to select a subset of publishers from the first set of publishers at which the second content should be published.

4. The method of claim 3 further comprising:
determining a payment amount based at least in part on a number of recommended publishers selected by the customer.

5. The method of claim 1 further comprising:
preparing a content questionnaire to present through the management interface based at least in part on the category or the subset of publishers.

6. The method of claim 1, wherein the first category is a telephone directory category.

7. The method of claim 1 further comprising:
retrieving at least some of the second content from the content repository; and
preparing a rendering of how the portion of the second content would appear if published by a publisher.

8. A system for centrally managing online interactions among publishers, the system comprising one or more processors and one or more memory storage areas, the system configured to:
- store an association between a first category in a directory and a first set of publishers, the first category representing a classification of a set of businesses sharing one or more common attributes;
- receive first content comprising information for unique identification of a business;
- match the business to the first category in the directory based at least in part on the first content;
- compile a superset of content based at least in part on the first set of publishers associated with the first category, the superset of content comprising types of content for publication by the first set of publishers associated with the first category;
- request second content for the business based at least in part on the superset of content;
- receive the second content;
- store the second content received for the business in a content repository; and
- transmit the second content to at least a subset of publishers from the first set of publishers for publication by the first set of publishers.

9. The system of claim 8 further configured to:
- translate the second content stored by the content repository to meet requirements of a publisher from the first set of publishers.

10. The system of claim 9 further configured to:
- rank the first set of publishers based at least in part on an importance rating; and
- receive customer input to select a subset of publishers from the first set of publishers at which the second content should be published.

11. The system of claim 10 further configured to:
- determine a payment amount based at least in part on a number of recommended publishers selected by the customer.

12. The system of claim 8 further configured to:
- prepare a content questionnaire to present through the management interface based at least in part on the category or the subset of publishers.

13. The system of claim 8, wherein the first category is a telephone directory category.

14. The system of claim 8 further configured to:
- retrieve at least some of the second content from the content repository; and
- prepare a rendering of how the portion of the second content would appear if published by a publisher.

15. A computer program product for centrally managing online interactions among publishers, the computer program product comprising at least one non-transitory computer-readable storage medium having computer-readable program code portions stored therein, the computer-readable program code portions comprising:
- an executable portion configured to store an association between a first category in a directory and a first set of publishers, the first category representing a classification of a set of businesses sharing one or more common attributes;
- an executable portion configured to receive first content comprising information for unique identification of a business;
- an executable portion configured to match the business to the first category in the directory based at least in part on the first content;
- an executable portion configured to compile a superset of content based at least in part on the first set of publishers associated with the first category, the superset of content comprising types of content for publication by the first set of publishers associated with the first category;
- an executable portion configured to request second content for the business based at least in part on the superset of content;
- an executable portion configured to receive the second content;
- an executable portion configured to store the second content received for the business in a content repository; and
- an executable portion configured to transmit the second content to at least a subset of publishers from the first set of publishers for publication by the first set of publishers.

16. The computer program product of claim 15 further comprising:
- an executable portion configured to translate the second content stored by the content repository to meet requirements of a publisher from the first set of publishers.

17. The computer program product of claim 16 further comprising:
- an executable portion configured to rank the first set of publishers based at least in part on an importance rating; and
- an executable portion configured to receive customer input to select a subset of publishers from the first set of publishers at which the second content should be published.

18. The computer program product of claim 17 further comprising:
- an executable portion configured to determine a payment amount based at least in part on a number of recommended publishers selected by the customer.

19. The computer program product of claim 15 further comprising:
- an executable portion configured to prepare a content questionnaire to present through the management interface based at least in part on the category or the subset of publishers.

20. The computer program product of claim 15, wherein the first category is a telephone directory category.

21. The computer program product of claim 15 further comprising:
- an executable portion configured to retrieve at least some of the second content from the content repository; and
- an executable portion configured to prepare a rendering of how the portion of the second content would appear if published by a publisher.

* * * * *